United States Patent
Sun et al.

(10) Patent No.: US 10,674,501 B2
(45) Date of Patent: *Jun. 2, 2020

(54) LOW LATENCY PHYSICAL DOWNLINK CONTROL CHANNEL AND PHYSICAL DOWNLINK SHARED CHANNEL

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US); Shimman Arvind Patel, San Diego, CA (US); SeyedKianoush Hosseini, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,335

(22) Filed: Feb. 14, 2019

(65) Prior Publication Data
US 2019/0191420 A1   Jun. 20, 2019

Related U.S. Application Data

(63) Continuation of application No. 15/671,972, filed on Aug. 8, 2017, now Pat. No. 10,368,345.

(Continued)

(51) Int. Cl.
*H04W 4/00* (2018.01)
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0092* (2013.01); *H04W 72/0446* (2013.01)

(58) Field of Classification Search
None
See application file for complete search history.

(56) References Cited

U.S. PATENT DOCUMENTS

| 10,368,345 B2 * | 7/2019 | Sun ..................... H04L 5/0053 |
| 2014/0071954 A1 * | 3/2014 | Au ..................... H04W 72/0446 370/336 |

(Continued)

FOREIGN PATENT DOCUMENTS

| WO | WO-2016053844 A1 | 4/2016 |
| WO | WO-2016064048 A1 | 4/2016 |
| WO | WO-2016064049 A1 | 4/2016 |

OTHER PUBLICATIONS

International Search Report and Written Opinion—PCT/US2017/046078—ISA/EPO—dated Oct. 18, 2017 (164661WO).

*Primary Examiner* — Clemence S Han
(74) *Attorney, Agent, or Firm* — Holland & Hart LLP

(57) ABSTRACT

Methods, systems, and devices for wireless communication are described. A base station may indicate time and frequency resources for a low latency physical downlink control channel (sPDCCH), which may be different from another physical downlink control channel (PDCCH), to a user equipment (UE). The base station may then transmit a common sPDCCH (CsPDCCH) message to indicate which low latency control channel elements (sCCEs) are used for sPDCCH transmission during a given subframe. In some cases, the signaling used to indicate the initial resource allocation for sPDCCH may be infrequent relative to the CsPDCCH transmissions. If some of the resources initially allocated for sPDCCH are not actually used for sPDCCH during a subframe, the base station and the UE may use those resources for communicating data. For example, the (Continued)

base station may transmit data using a low latency physical downlink shared channel (sPDSCH) to the UE using those resources.

30 Claims, 18 Drawing Sheets

Related U.S. Application Data

(60) Provisional application No. 62/373,312, filed on Aug. 10, 2016.

(56) References Cited

U.S. PATENT DOCUMENTS

| | | | |
|---|---|---|---|
| 2016/0066316 A1* | 3/2016 | Bhushan | H04W 72/0446 370/329 |
| 2016/0100395 A1* | 4/2016 | Xu | H04L 1/1607 370/336 |
| 2017/0230994 A1* | 8/2017 | You | H04W 72/042 |
| 2017/0318564 A1* | 11/2017 | Lee | H04L 1/00 |
| 2017/0325164 A1* | 11/2017 | Lee | H04W 52/0216 |
| 2018/0007683 A1* | 1/2018 | You | H04L 1/0067 |
| 2018/0049166 A1 | 2/2018 | Sun et al. | |
| 2018/0234998 A1 | 8/2018 | You et al. | |
| 2018/0359068 A1 | 12/2018 | Kim et al. | |

* cited by examiner

LOW LATENCY PHYSICAL DOWNLINK CONTROL CHANNEL AND PHYSICAL DOWNLINK SHARED CHANNEL

CROSS REFERENCES

The present Application for Patent is a Continuation of U.S. patent application Ser. No. 15/671,972 by Sun et al., entitled "Low Latency Physical Downlink Control Channel And Physical Downlink Shared Channel," filed Aug. 8, 2017, which claims priority to U.S. Provisional Patent Application No. 62/373,312 by Sun, et al., entitled "Low Latency Physical Downlink Control Channel and Physical Downlink Shared Channel," filed Aug. 10, 2016, assigned to the assignee.

BACKGROUND

The following relates generally to wireless communication and more specifically to communication using a low latency physical downlink control channel (sPDCCH) and low latency physical downlink shared channel (sPDSCH).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-a ccess systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A base station may transmit control information to a UE to allocate resources for data transmissions. A portion of the physical layer resources (i.e., time and frequency resources) may be designated for transmission of this control information. However, the number of resources used for control transmissions may vary, so the dedicated control region may be underutilized. This overhead may result in reduced system bandwidth and may negatively impact system performance.

SUMMARY

A base station may indicate time and frequency resources for a low latency physical downlink control channel (sPDCCH) to a user equipment (UE). The base station may then transmit a common sPDCCH (CsPDCCH) message to indicate which low latency control channel elements (sCCEs) are actually used for sPDCCH transmission during a given subframe. In some cases, the signaling used to indicate the initial resource allocation for sPDCCH may be infrequent relative to the CsPDCCH transmissions. If resources allocated for sPDCCH are not actually used for sPDCCH during a subframe, the base station and the UE may use those resources for communicating data. For example, the base station may transmit data using a low latency physical downlink shared channel (sPDSCH) to the UE using those resources.

A method of wireless communication in a system that supports communications using a first duration transmission time interval (TTI) and a second duration TTI that is shorter than the first duration TTI is described. The method may include receiving signaling that identifies resources for a control channel associated with the second duration TTI, receiving a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time, and communicating data using a portion of the resources for the control channel based at least in part on a location of the user-specific control message and a grant received in the user-specific control message.

An apparatus for wireless communication in a system that supports communications using a first duration TTI and a second duration TTI that is shorter than the first duration TTI is described. The apparatus may include means for receiving signaling that identifies resources for a control channel associated with the second duration TTI, means for receiving a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time, and means for communicating data using a portion of the resources for the control channel based at least in part on a location of the user-specific control message and a grant received in the user-specific control message.

Another apparatus for wireless communication in a system that supports communications using a first duration TTI and a second duration TTI that is shorter than the first duration TTI is described. The apparatus may include a processor, memory in electronic communication with the processor, and instructions stored in the memory. The instructions may be operable to cause the processor to receive signaling that identifies resources for a control channel associated with the second duration TTI, receive a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time, and communicate data using a portion of the resources for the control channel based at least in part on a location of the user-specific control message and a grant received in the user-specific control message.

A non-transitory computer readable medium for wireless communication in a system that supports communications using a first duration TTI and a second duration TTI that is shorter than the first duration TTI is described. The non-transitory computer-readable medium may include instructions operable to cause a processor to receive signaling that identifies resources for a control channel associated with the second duration TTI, receive a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time, and communicate data using a portion of the resources for the control channel based at least in part on a location of the user-specific control message and a grant received in the user-specific control message.

Some examples of the method, apparatus, and non-transitory computer-readable medium described above may further include processes, features, means, or instructions for receiving a control message of the control channel for indicating to at least one UE a subset of the resources for the control channel used for transmitting the control channel. Some examples of the method, apparatus, and non-transitory computer-readable medium described above may further include processes, features, means, or instructions for identifying the portion of the resources for the control channel that may be used for communicating data based at least in part on the control message.

In some examples of the method, apparatus, and non-transitory computer-readable medium described above, the control message comprises a bitmap corresponding to the subset of the resources for the control channel, wherein each bit of the bitmap indicates whether one or more control channel elements (CCEs) of the identified resources for the control channel may be used for transmitting the control channel.

Some examples of the method, apparatus, and non-transitory computer-readable medium described above may further include processes, features, means, or instructions for performing a rate matching operation for the data based at least in part on the control message, wherein the data may be communicated based at least in part on the rate matching operation.

Some examples of the method, apparatus, and non-transitory computer-readable medium described above may further include processes, features, means, or instructions for identifying a search space for the control channel based at least in part on the identified resources. Some examples of the method, apparatus, and non-transitory computer-readable medium described above may further include processes, features, means, or instructions for performing a blind decoding operation based at least in part on the search space, wherein the user-specific control message may be received based at least in part on the blind decoding operation.

In some examples of the method, apparatus, and non-transitory computer-readable medium described above, the signaling comprises an indication of one or more symbol periods used for the control channel, an indication of frequency domain resources used for the control channel, or an aggregation level of a control message, or any combination thereof.

In some examples of the method, apparatus, and non-transitory computer-readable medium described above, the resources for the control channel comprise a pattern of CCEs associated with two symbol duration TTIs, slot duration TTIs, or both.

In some examples of the method, apparatus, and non-transitory computer-readable medium described above, the first duration TTI comprises a subframe duration TTI, the second duration TTI comprises a two symbol duration TTI, and wherein the resources for the control channel include resources located after a first symbol and a second symbol of a slot duration TTI.

In some examples of the method, apparatus, and non-transitory computer-readable medium described above, each CCE of the pattern corresponds to a first symbol of a two symbol duration TTI.

In some examples of the method, apparatus, and non-transitory computer-readable medium described above, one or more CCEs of the pattern include a plurality of symbol periods associated with a slot duration TTI duration.

In some examples of the method, apparatus, and non-transitory computer-readable medium described above, the CCEs associated with slot duration TTIs and the CCEs associated with two symbol duration TTIs each comprise two symbol periods.

In some examples of the method, apparatus, and non-transitory computer-readable medium described above, the CCEs associated with slot duration TTIs comprise two symbol periods and the CCEs associated with two symbol duration TTIs comprise one symbol period.

Some examples of the method, apparatus, and non-transitory computer-readable medium described above may further include processes, features, means, or instructions for determining whether a TTI may be a two symbol duration TTI or a slot duration TTI based at least in part on the signaling or the user-specific control message.

Some examples of the method, apparatus, and non-transitory computer-readable medium described above may further include processes, features, means, or instructions for receiving one or more cell-specific reference signals (CRS) or demodulation reference signals (DMRS) based at least in part on the resources for the control channel.

Some examples of the method, apparatus, and non-transitory computer-readable medium described above may further include processes, features, means, or instructions for identifying a resource block group (RBG) size, wherein the data may be communicated based at least in part on the RBG size.

A method of wireless communication in a system that supports communications using a first duration TTI and a second duration TTI that is shorter than the first duration TTI is described. The method may include transmitting signaling that identifies resources for a control channel associated with the second duration TTI, transmitting a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time, and communicating data using a portion of the resources for the control channel identified in the user-specific control message.

An apparatus for wireless communication in a system that supports communications using a first duration TTI and a second duration TTI that is shorter than the first duration TTI is described. The apparatus may include means for transmitting signaling that identifies resources for a control channel associated with the second duration TTI, means for transmitting a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time, and means for communicating data using a portion of the resources for the control channel identified in the user-specific control message.

Another apparatus for wireless communication in a system that supports communications using a first duration TTI and a second duration TTI that is shorter than the first duration TTI is described. The apparatus may include a processor, memory in electronic communication with the processor, and instructions stored in the memory. The instructions may be operable to cause the processor to transmit signaling that identifies resources for a control channel associated with the second duration TTI, transmit a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time, and communicate data using a portion of the resources for the control channel identified in the user-specific control message.

A non-transitory computer readable medium for wireless communication in a system that supports communications using a first duration TTI and a second duration TTI that is shorter than the first duration TTI is described. The non-transitory computer-readable medium may include instructions operable to cause a processor to transmit signaling that identifies resources for a control channel associated with the second duration TTI, transmit a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time, and communicate data using a portion of the resources for the control channel identified in the user-specific control message.

Some examples of the method, apparatus, and non-transitory computer-readable medium described above may further include processes, features, means, or instructions for identifying the portion of the resources for the control channel that may be used for transmitting the control channel. Some examples of the method, apparatus, and non-transitory computer-readable medium described above may further include processes, features, means, or instructions for transmitting a control message of the control channel for indicating to at least one UE a subset of the resources used for transmitting the control channel.

In some examples of the method, apparatus, and non-transitory computer-readable medium described above, the control message comprises a bitmap corresponding to the subset of the resources for the control channel, wherein each bit of the bitmap indicates whether one or more CCEs of the identified resources for the control channel may be used for transmitting the control channel.

Some examples of the method, apparatus, and non-transitory computer-readable medium described above may further include processes, features, means, or instructions for performing a rate matching operation for the data based at least in part on the portion of the resources for the control channel that may be used for transmitting the control channel.

In some examples of the method, apparatus, and non-transitory computer-readable medium described above, the resources for the control channel comprise a pattern of CCEs associated with two symbol duration TTIs, slot duration TTIs, or both.

DETAILED DESCRIPTION

A base station may configure a user equipment (UE) with resources for a low latency physical downlink control channel (sPDCCH). The configuration may be communicated using relatively infrequent control signaling, which may be referred to as slow signaling. The slow signaling may indicate a configuration of low latency control channel elements (sCCEs), which may be used for sPDCCH. More frequent signaling, which may be a common (i.e., not UE-specific) control message, may then be used to indicate which sCCEs are actually used for sPDCCH within the assigned sPDCCH resource. The common control signaling using sPDCCH resources may be referred to as a common sPDCCH (CsPDCCH).

By way of example, the CsPDCCH payload may include a bitmap dynamically indicating sCCE usage. If the CsPDCCH indicates that a sCCE is not being used for sPDCCH, the base station may transmit data to the UE using the unused resources using a low latency physical downlink shared channel (sPDSCH). For example, the base station and the UE may perform rate matching on an sPDSCH transmission based on whether resources are being used for sPDCCH.

In some cases, the CsPDCCH may be transmitted at a known location, for example at a first sCCE or first few sCCEs within the sPDCCH region. This may enable the UE to identify the location of the CsPDCCH without extra blind decodings.

Aspects of the disclosure introduced above are described below in the context of a wireless communications system. Examples of slow signaling and sPDCCH resource allocations are then described. Aspects of the disclosure are further illustrated by and described with reference to apparatus diagrams, system diagrams, and flowcharts that relate to sPDCCH and sPDSCH.

Figure 1:
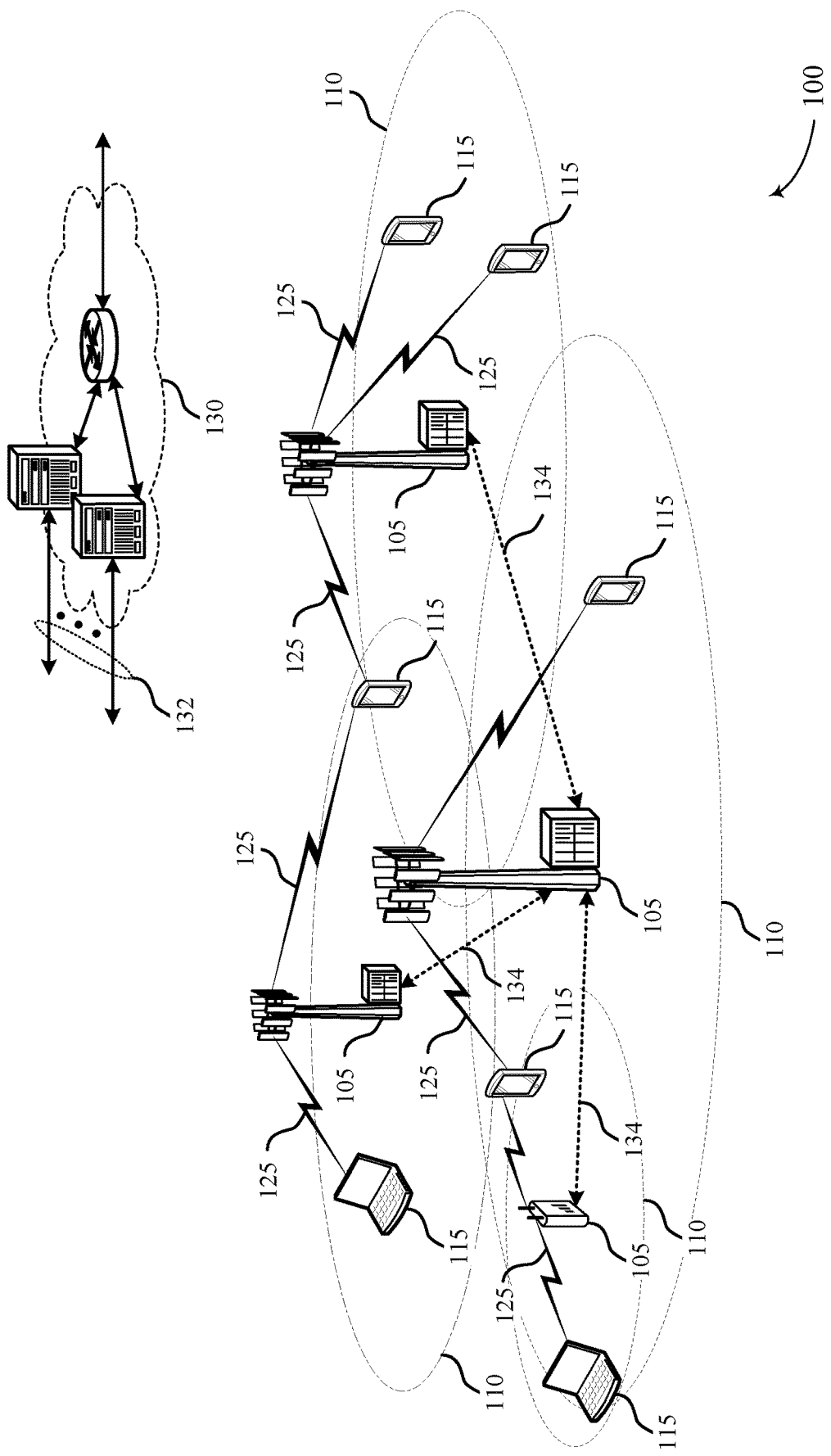
FIG. 1 illustrates an example of a system for wireless communication that supports low latency physical downlink control channel (sPDCCH) and low latency physical downlink shared channel (sPDSCH) in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. The wireless communications system 100 may communicate via sPDCCH and sPDSCH. For example, a base station 105 may transmit slow signaling to the UE 115 which indicates sCCEs eligible for sPDCCH. Then, the base station 105 may transmit a CsPDCCH that indicates which sCCEs carry sPDCCH, and any sCCEs which are not used for sPDCCH may be used for sPDSCH.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like. Some UEs 115 may support lower latency communication relative to other UEs 115 within the system 100. Such low latency UEs 115 may support communications using transmission time intervals (TTIs) of a shorter length or duration relative to other TTIs employed with the system 100.

Time intervals in Long Term Evolution (LTE) may be expressed in multiples of a basic time unit (e.g., the sampling period, $T_s=1/30,720,000$ seconds). Time resources may be organized according to radio frames of length of 10 ms ($T_f=307200\ T_s$), which may be identified by an SFN ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in short TTI bursts or in selected component carriers using short TTIs). In the example depicted in FIG. 1, system 100 supports communications using low latency TTIs (e.g., TTIs having a duration of one symbol period, two symbol periods, three symbol periods, one slot, or the like). A low latency TTI may be referred to as an sTTI. TTIs that with a greater duration TTI, such as an LTE subframe, may be referred to as a non-low latency TTI.

Physical resources may be organized in resource elements. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. In some cases, resources elements may include DL reference signals (DL-RS). The DL-RS may include a cell specific reference signal (CRS) and a UE-specific RS (UE-RS). UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate.

In some examples, wireless communications system 100 may utilize enhanced component carriers (eCCs). An eCC may be characterized by one or more features including: wider bandwidth, shorter symbol duration, sTTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration is associated with increased subcarrier spacing.

A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

Within system 100, a physical downlink control channel (PDCCH) carries downlink control information (DCI) in at least one CCE, which may consist of nine logically contiguous REGs, where each REG contains 4 resource elements. DCI includes information regarding downlink (DL) scheduling assignments, uplink (UL) resource grants, transmission scheme, UL power control, hybrid automatic repeat request (HARD) information, MCS, and other information. The size and format of the DCI messages can differ depending on the type and amount of information that is carried by the DCI. For example, if spatial multiplexing is supported, the size of the DCI message may be large compared to contiguous frequency allocations. Similarly, for a system that employs MIMO, the DCI may include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identifier (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115.

CCEs may be grouped (e.g., in groups of 1, 2, 4 and 8 CCEs), and a set of CCE locations in which the UE 115 may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

Wireless systems that support low latency operations, such as system 100, may utilize a low latency physical downlink control channel (sPDCCH). An sPDCCH may use resources that are distributed throughout the region that would otherwise be used for data transmissions in a non-low latency system (e.g., the physical downlink shared channel (PDSCH) in some releases of LTE). The sPDCCH may use resources that are organized according to low latency CCEs (sCCEs). An sCCE may span one, two, or more symbol periods, and may depend on the length or duration of the sTTI (e.g., two symbol period duration, three symbol period duration, one slot duration, etc.).

Figure 2:
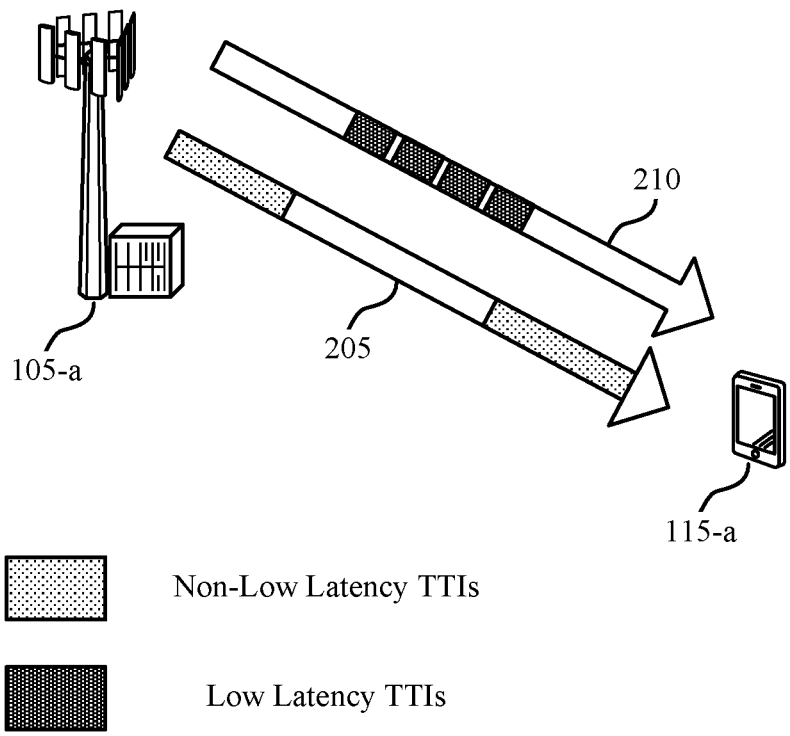
FIG. 2 illustrates an example of a wireless system that supports sPDCCH and sPDSCH in accordance with aspects of the present disclosure.

FIG. 2 illustrates an example of a wireless system 200 that supports sPDCCH and sPDSCH. The wireless system 200 may include base station 105-a and UE 115-a, which may be examples of a base station 105 and a UE 115 as described herein with reference to FIG. 1. Base station 105-a may configure UE 115-a with resources for sPDCCH transmission. Base station 105-a may periodically change the sPDCCH resource configuration of UE 115-a using relatively infrequent transmissions, which, as mentioned above, may be referred to as slow signaling. Wireless system 200 may support non-low latency communication 205 (e.g., communications according to earlier versions of a wireless communications standard, such as LTE) and a low latency communication 210.

Base station 105-a may transmit slow signaling to UE 115-a to indicate a pattern of resources for sPDCCH. In some cases, the slow signaling may be transmitted in a non-low latency communication 205 (e.g., in a radio resource control (RRC) message or a PDCCH transmission). The slow signaling may semi-statically allocate sCCEs for the sPDCCH. In some cases, non-low latency communication 205 may be transmitted over a control channel that may be a UE-specific control channel, such as a UE-specific sPDCCH, or a common control channel, such as a CsPDCCH. The UE-specific control channel may transport a UE-specific control message that is addressed to, and intended for, a specific UE. In another example, the non-low latency communication 205 may be transmitted over a common control channel that may transport a control message that is intended for one or more UEs, including up to all UEs connected to a base station. In another example, non-low latency communication 205 may be transmitted over a common control channel that may transport a UE-specific control message that is addressed to, and intended for, a specific UE.

By way of example, the slow signaling may indicate which time resources (i.e., subframes and symbol periods within subframes) are used for sPDCCH. In some examples, a first sTTI in a first slot (e.g., slot 0) may not use the sPDCCH if the sDCIs for the one slot sTTI is transmitted in the PDCCH region in the slot. The slow signaling may also indicate frequency resources (i.e., resource blocks) that are allocated or available for sPDCCH. In some examples, sCCEs may be defined (e.g., a number of sCCEs) based on the dynamic reservation of low latency resources, for example if some portions of the sPDCCH regions serve more UEs than other portions of the sPDCCH region. A first sTTI in a slot may contain more sCCEs to support more UEs 115 and may be configured for sTTIs of different durations, while a later sPDCCH region in a slot may only serve UEs 115 configured for sTTIs of a duration shorter than a one slot sTTI duration. For example, a device may be configured for communication using sTTIs containing one slot duration (e.g., a one slot sTTI), and another device may be configured for communication using sTTIs containing two symbol periods (e.g., a two symbol sTTI). In some examples, a two symbol sTTI may contain three symbols periods, and a one slot sTTI may contain anywhere from five to seven symbols periods. For instance, a nominal duration of an sTTI may be two symbol periods, but a particular resource assignment may span three symbols. In some examples, a nominal sTTI duration may be one slot, but a resource assignment may use more or fewer symbols than one slot.

Slow signaling may indicate sPDCCH regions containing sCCEs for the sPDCCH. The sPDCCH region may depend on whether a subframe is configured for cell-specific reference signals (CRS) based demodulation. In cases when demodulation reference signals (DMRS) are used (e.g., for a multicast-broadcast single frequency network (MBFSN) subframe), the DMRS may be configured to have a similar structure to CRS. The sPDCCH region may include a common search space or a search space specific to a UE, such as UE 115-a, or both. The common search space and the UE-specific search space may be hashed into an sCCE addressing space. For UE 115-a to be scheduled, base station 105-a may use a hash rule of UE 115-a to find sCCEs to fill the sPDCCH. UE 115-a may use blind decoding to pick up grants in a hashed sCCE space.

In some cases, multiple OFDM symbols may be used for the sPDCCH. For devices configured for two symbol low latency communication, the search space may include a first OFDM symbol in the beginning of the sTTI. For devices configured for one slot low latency communication, the search space may be sCCEs in any OFDM symbol indicated in the slow signaling.

In some cases, not all of the resources that are indicated as being allocated for sPDCCH in the slow signaling are actually used for sPDCCH. Thus, if an sTTI contains resources allocated for sPDCCH via the slow signaling, base station 105-a may also send information regarding which resources are actually being used for sPDCCH. This information may be included in a common sPDCCH (CsPDCCH) transmission.

In some cases, low latency communication 210 may be transmitted over a control channel that may be a UE-specific control channel, such as a UE-specific sPDCCH, or a common control channel, such as a CsPDCCH. The UE-specific control channel may transport a UE-specific control message that is addressed to, and intended for, a specific UE. In another example, the low latency communication 210 may be transmitted over a common control channel that may transport a control message that is intended for one or more UEs, including up to all UEs connected to a base station. In another example, low latency communication 210 may be transmitted over a common control channel that may transport a UE-specific control message that is addressed to, and intended for, a specific UE.

A CsPDCCH transmission may be used to indicate which sCCEs in the sPDCCH region are to be used for the sPDCCH. The CsPDCCH may be transmitted in a low latency communication 210. After sPDCCH scheduling, base station 105-a may identify any used sCCEs and broadcast the sCCEs to be used by the CsPDCCH. The CsPDCCH payload may include a bitmap dynamically indicating sCCE usage (e.g., a "1" in a bitmap field may indicate that a corresponding sCCE will be used for the sPDCCH). The length of the bitmap may be based on the number of sCCEs in the sPDCCH.

If the CsPDCCH payload is relatively short or small in size, the aggregation level may be small and still provide sufficient coverage. Thus, the content of the CsPDCCH may be reduced in several ways. For example, in some cases, the sCCE bitmap may not include bits for the sCCEs reserved for the CsPDCCH. That is, the CsPDCCH may be at a known location. For example, the CsPDCCH may occur at the first sCCE or the first few sCCEs.

In some examples, sCCEs may be grouped to reduce the size of the payload. However, grouping sCCEs may not efficiently use sCCEs in some cases. In some cases, CsPDCCH may not be transmitted if the resources of sCCEs that are not used for sPDCCH are also not used for sPDSCH. That is, if the sCCEs are not reused (e.g., no identified downlink grant), the CsPDCCH may not be transmitted. Therefore, the CsPDCCH may occur in an sTTI when there is a downlink grant cover in the sPDCCH region. If a downlink grant is detected, UE 115-a may rate match around the sCCEs identified in the CsPDCCH. In another example, the CsPDCCH may be transmitted when the sPDCCH is defined according to a slow signaling.

For a two symbol duration sTTI configuration, the sPDCCH may be transmitted in the first OFDM symbol of a two symbol duration sTTI. For a one slot duration sTTI configuration, the sPDCCH may be transmitted in a first few OFDM symbols, which may allow for additional control dimension. If sTTI configurations are mixed in a subframe, a first few OFDM symbols in a slot may carry the sPDCCH for one slot duration sTTI configured devices and two symbol duration sTTI configured devices. More than one symbol may be used for sPDCCH if there is not a two symbol duration sTTI configured device.

Low latency downlink control information (sDCI) transmitted over the sPDCCH may be statically configured for either two symbol duration sTTI or one slot duration sTTI communication. For example, sDCI may not distinguish devices configured for two symbol duration sTTI communication from devices configured for one slot duration sTTI communication. UE 115-a may decode a grant and use the static configuration to determine whether the grant is configured for devices that support two symbol duration sTTI communication or devices that support one slot duration sTTI communication. The RB allocation field of the two types of sDCI may be the same (e.g., may only use one sDCI format definition). If the sDCI is not statically configured, there may be an additional bit in the sDCI to indicate whether the sDCI is configured for one slot duration sTTI communication or two symbol duration sTTI communication.

An sPDCCH may allocate resources for sPDSCH transmission. A resource block group (RBG) may be used as an assignment unit for sPDSCH. An RGB size may be different in two symbol and 1 slot sDCI. An sPDSCH RB may not be in a set of RBs indicated in a slow signaling for a control region (e.g., sPDSCH and sPDCCH can dynamically multiplex). If there are mixed two symbol and one slot configurations, the slow signaling may indicate the location of two symbol sTTIs, and devices configured for one slot low latency communication with a downlink grant may also decode the CsPDCCH in the sPDCCH region for two symbol sTTIs in the middle of the slot. Even if the device configured for two symbol low latency communication does not have a downlink grant, CsPDCCH may still be transmitted to provide rate matching information for one slot sTTI duration configured sPDSCH. In some examples, the one slot sTTI duration configured sPDSCH may be transmitted. The one slot sTTI duration configured sPDSCH may be punctured at the sCCEs used for two symbol duration sTTI grants. If a CsPDCCH indicates that an sCCE may not be used for the sPDCCH, sPDSCH may be transmitted using the sCCE instead.

Figure 3:
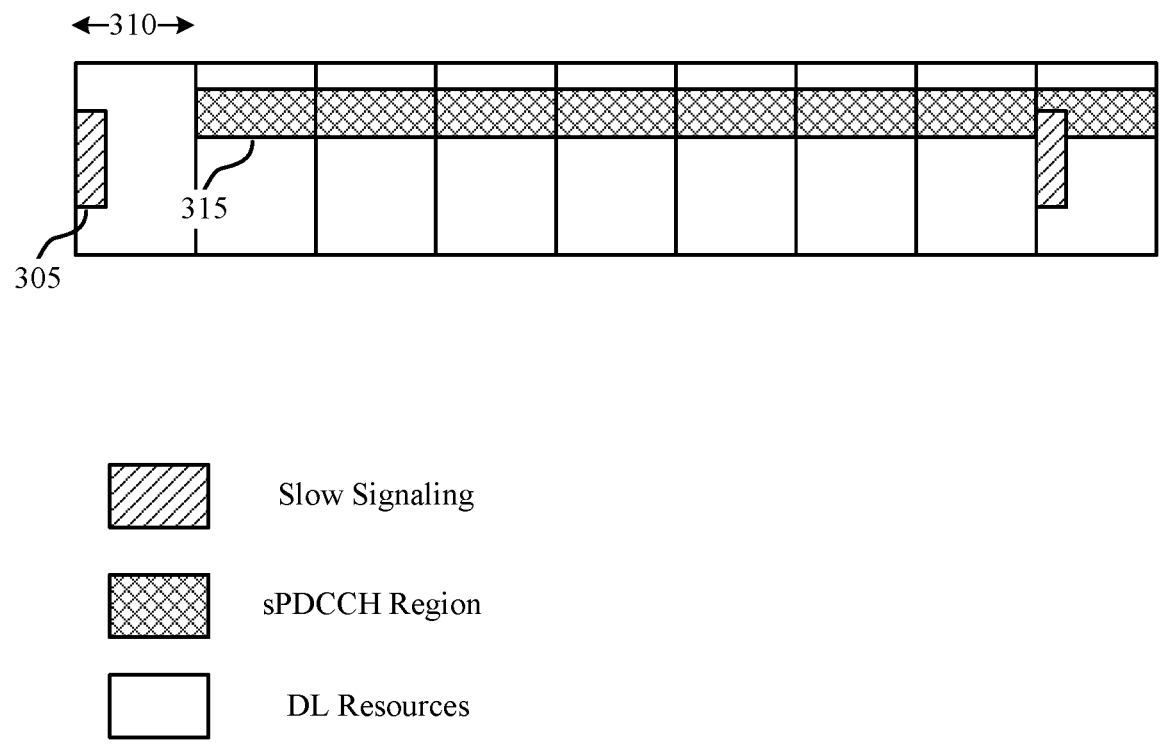
FIG. 3 illustrates an example of a slow signaling pattern that supports sPDCCH and sPDSCH in accordance with aspects of the present disclosure.

FIG. 3 illustrates an example of a slow signaling pattern 300 that supports sPDCCH and sPDSCH. A base station 105 may transmit a signal to a UE 115, which may indicate resources for an sPDCCH region 315. The base station 105 may periodically change the configuration of the UE 115 using slow signaling 305.

A base station 105 may transmit slow signaling 305 to a UE 115. The slow signaling 305 may be transmitted as a radio resource control (RRC) or a slow broadcast downlink control information (DCI) in PDCCH. The slow signaling 305 may indicate a frequency domain region and a time domain region where the base station may transmit sPDCCH. For example, the slow signaling 305 may indicate which sTTIs may contain sPDCCH. The UE may only search in sTTIs indicated by the slow signaling for sPDCCH. Additionally, the slow signaling 305 may indicate which resource blocks (RBs) may contain the sPDCCH. A configuration for sTTI control channel elements (sCCEs) may be determined based on the slow signaling 305.

DL resources 310 may be organized in the time domain according to 1 ms subframes, as described above. In some cases (i.e., in non-low latency operation) the subframes may also represent a TTI. However, in other cases, a subframe may include multiple TTIs (i.e., in low latency operation). In some examples, the DL resources 310 may include the slow signaling 305 or an sPDCCH region 315, or both.

The sPDCCH region 315 may include time and frequency resources, organized into sCCEs, on which an sPDCCH may be transmitted. The sPDCCH region 315 may be based on CRS based reference signal configuration. In some examples, the sPDCCH region 315 may be used to transmit a CsPDCCH. The CsPDCCH may indicate sCCEs, which are to be used for sPDCCH transmission. The CsPDCCH payload may include a bitmap indicating sCCE usage (e.g., a "1" in a bitmap field may indicate that a corresponding sCCE will be used for sPDCCH transmission). The length of the bitmap may be based on a number of sCCEs in the sPDCCH control region. In some cases, any bits representing sCCEs used for transmission of the CsPDCCH may be mapped to "1." Or the bitmap may not include bits for the sCCEs used for the CsPDCCH transmission.

In some cases, the CsPDCCH transmission may be at a known location within the sPDCCH region 315. For example, the CsPDCCH transmission may occur at a beginning of a DL resources 310 or in a TTI near the beginning of the subframe. The CsPDCCH transmission may occur in the first few symbol periods of a TTI. The CsPDCCH transmission may indicate which sCCEs may be used for sPDCCH, or which sCCEs may be reused (e.g., used for sPDSCH). If sCCEs cannot be reused (e.g., no identified downlink grant), the CsPDCCH may not be transmitted. Therefore, the CsPDCCH transmission may occur in an sTTI when there is a downlink grant in the sTTI. In another example, the CsPDCCH transmission may be transmitted when there is an sPDCCH region defined according to the slow signaling 305.

Figure 4A:
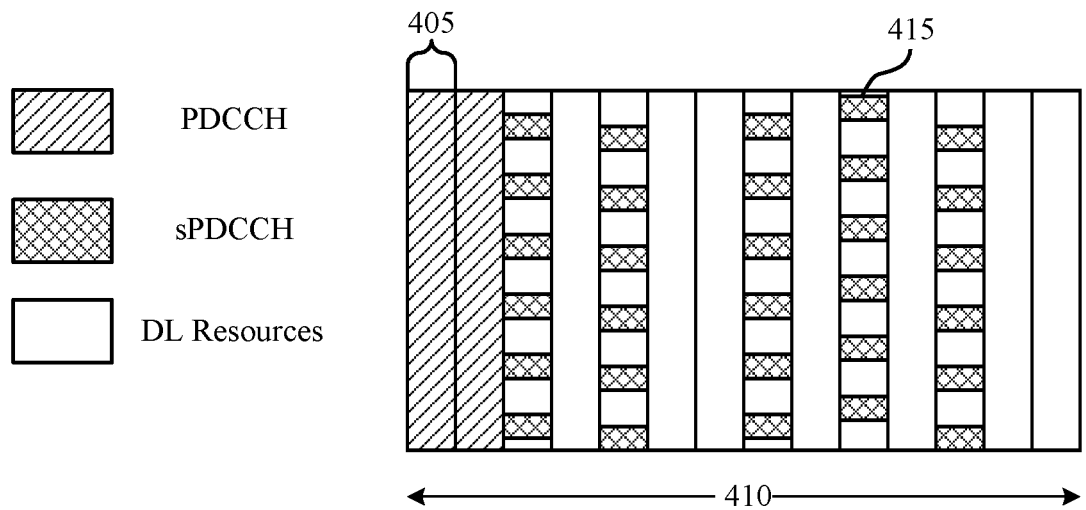
FIGS. 4A through 4B illustrate examples of an sPDCCH configuration that supports sPDCCH and sPDSCH in accordance with aspects of the present disclosure.
Figure 4B:
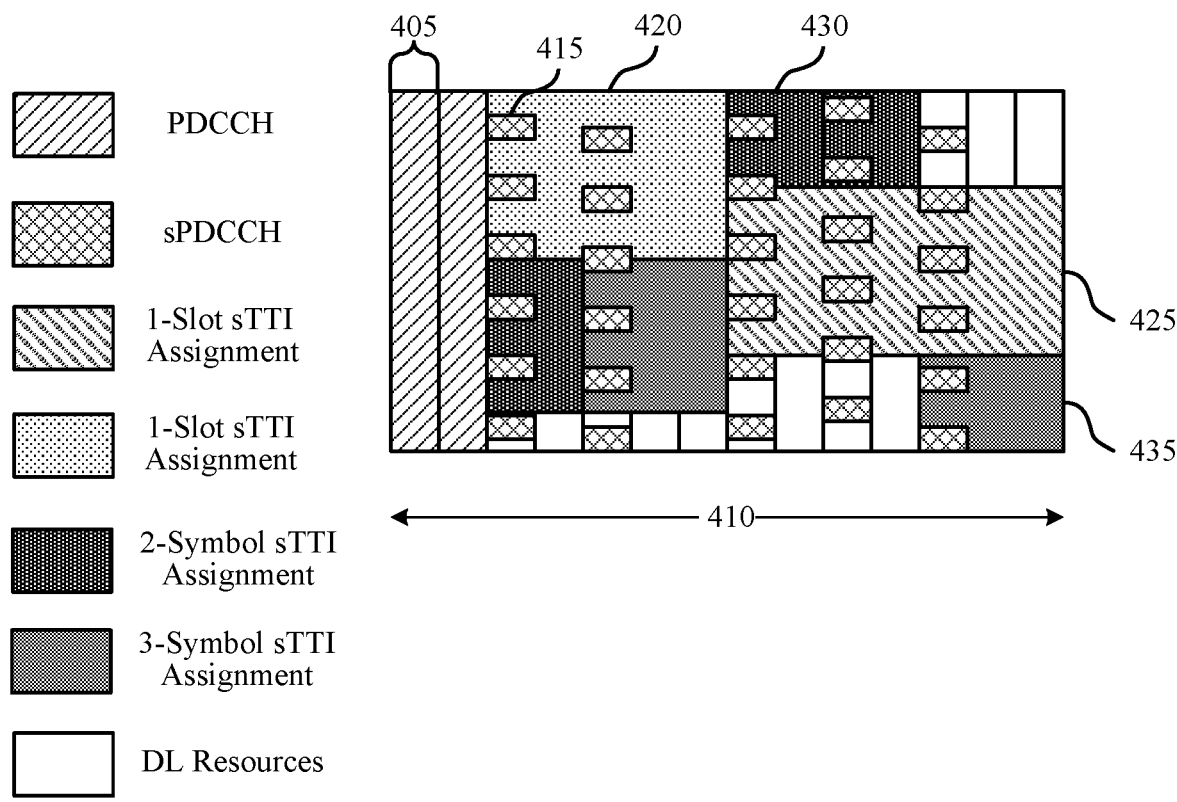

FIGS. 4A and 4B illustrate examples of sPDCCH configurations 400-a and 400-b that support sPDCCH and sPDSCH. A base station 105 may transmit sPDCCH to a UE 115 using one or more low latency configurations (e.g., based on one or more sTTI durations). For example, the sPDCCH may be transmitted based on configurations for a one slot duration sTTI or a two symbol duration sTTI.

As illustrated in FIG. 4A, symbol periods used for non-low latency PDCCH 405 may be at the beginning of a subframe 410. The PDCCH 405 may be used for a base station 105 to transmit downlink control information (DCI) to a UE 115. For example, in some cases, PDCCH 405 may be used to transmit slow signaling to configure or identify sPDCCH resources 415.

Some symbol periods of the subframe 410 may include sPDCCH resources 415. The sPDCCH resources 415 may be used to transmit DCI for low latency communication. In some cases, the sPDCCH resources 415 may include a CsPDCCH. CsPDCCH may indicate which CCEs of sPDCCH resources 415 are actually used for transmission of sPDCCH. If an sCCE transmitted in the sPDCCH resources 415 is not used for sPDCCH resources 415, the sCCE may be used for sPDSCH transmission. In some examples, the sPDCCH resources 415 may be included in the PDCCH 405.

The sPDCCH configuration 400-b of FIG. 4B may illustrate the use of sPDCCH for sTTI configurations of varying length. For example, one slot duration sTTI assignment 420 may represent one example of a low latency configuration. The one slot duration sTTI assignment 420 may be a set of resources defined by a CsPDCCH transmitted in sPDCCH resource 415. The one slot duration sTTI assignment 420 may span, for example, 5 symbol periods (because it may have two symbol periods reserved for PDCCH). The one slot duration sTTI assignment 420 may include resources for both sPDCCH and sPDSCH.

A second one slot duration sTTI assignment 425 may represent another example of a one slot sTTI configuration. The one slot duration sTTI assignment 425 may be similar to the one slot duration sTTI assignment 420, but may span seven symbol periods instead of five symbol periods (because no symbols are reserved for PDCCH).

A two symbol duration sTTI assignment 430 may another example of low latency resource configuration. In some cases, a base station 105 may configure resources using slot duration sTTIs and two symbol sTTIs during the same subframe. For example, some UEs 115 may be configured for slot TTI low latency operation and other UEs 115 may be configured for two symbol low latency operation.

Two symbol duration sTTI assignment 435 may be another example of a low latency configuration. The two symbol duration sTTI assignment 435 may be similar to a two symbol duration sTTI assignment 430. However, the two symbol duration sTTI assignment 435 may span three symbol periods in order to ensure that the slot duration sTTIs are aligned with the two symbol sTTIs.

The sPDCCH resources 415 may be configured such that each CCE coincides with the beginning of an sTTI (either a slot duration sTTI such as the one slot duration sTTI assignment 420, or a two symbol sTTI such as the two symbol duration sTTI assignment 430).

Figure 5:
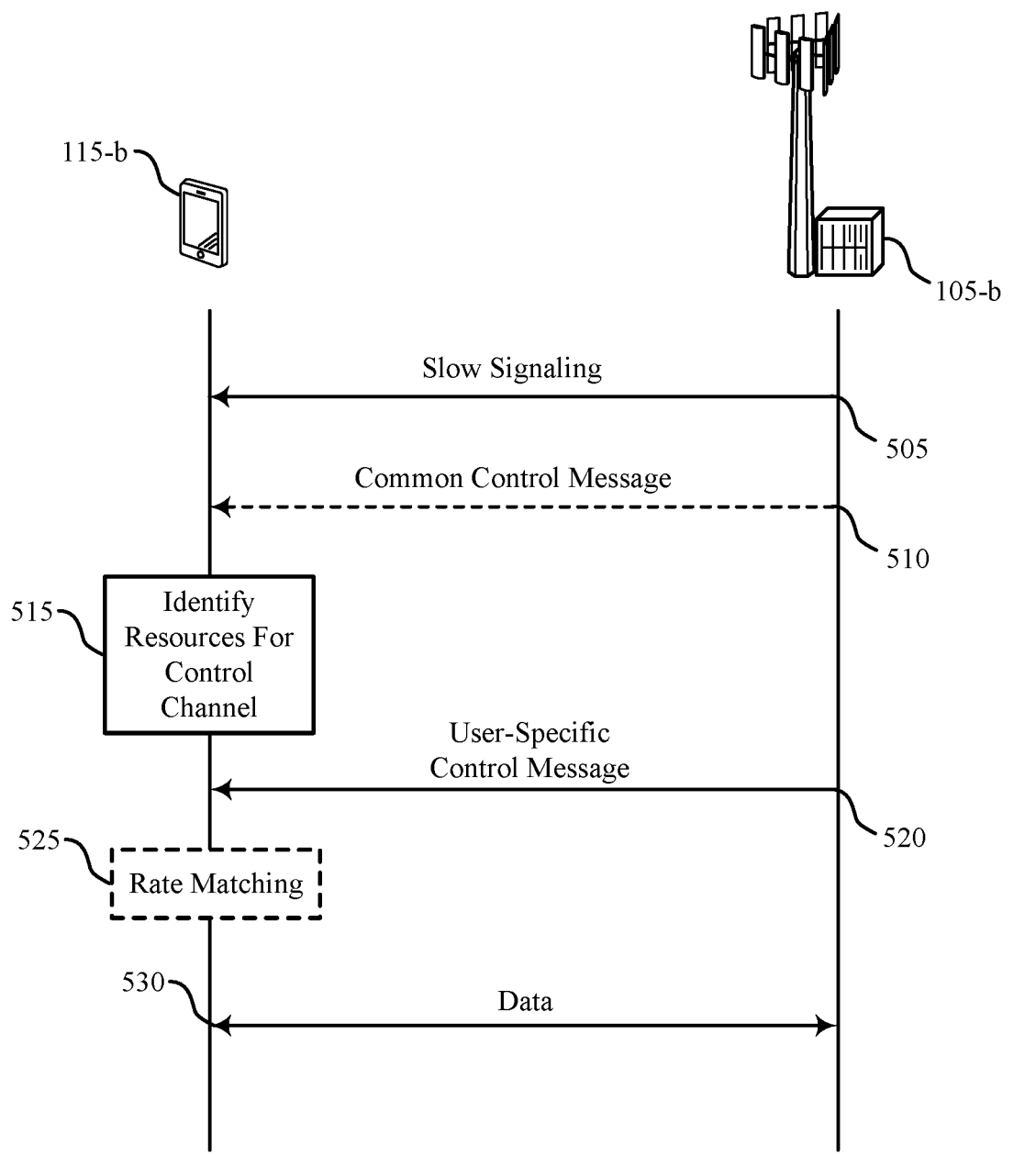
FIGS. 5 through 7 show block diagrams of a device or devices that support sPDCCH and sPDSCH in accordance with aspects of the present disclosure.

FIG. 5 shows a process flow 500 that supports sPDCCH and sPDSCH in accordance with various aspects of the present disclosure. The process flow 500 may illustrate operations performed by UE 115-b and base station 105-b, which may be examples of a UE 115 and a base station 105 described herein with reference to FIGS. 1-4. Process flow 500 represents exemplary operations within a wireless system in which UE 115-b receives sPDCCH and sPDSCH from base station 105-b as indicated in a slow signaling. The wireless system may support communications using a first duration TTI and a second duration TTI that is shorter than the first duration TTI.

At step 505, base station 105-b may transmit slow signaling to UE 115-b. The slow signaling may identify resources for a control channel associated with low latency operation (i.e., using a second TTI that is shorter than a first, non-low latency TTI). In some cases, the control channel may be a UE-specific control channel, such as a UE-specific sPDCCH, or a common control channel, such as a CsPDCCH. The UE-specific control channel may transport a UE-specific control message that is addressed to, and intended for, a specific UE. In another example, the common control channel may transport a control message that is intended for one or more UEs, including up to all UEs connected to a base station. In another example, a common control channel may transport a UE-specific control message that is addressed to, and intended for, a specific UE. The slow signaling may indicate to UE 115-b a pattern of resources for sPDCCH. In some cases, the slow signaling may be transmitted in a non-low latency transmission and, in other cases, the slow signaling is communicated using low latency transmissions.

At step 510, base station 105-b may transmit a common control message (e.g., a CsPDCCH) to UE 115-b. The common control message may indicate a subset of the resources for the control channel used for transmitting the control channel. In some cases, the common control message may include a bitmap corresponding to the subset of resources for the control channel. Each bit of the bitmap may indicate whether one or more CCEs are to be used for transmitting the control channel. The common control message may be scrambled using a common RNTI.

At step 515, UE 115-*b* may identify which resources will be used for the control channel based on the common control message. The resources may be associated with the second duration TTI. The resources may be used for communicating data based on the common control channel. For example, the resources may include a pattern of CCEs associated with two symbol duration TTIs, slot duration TTIs, or both. UE 115-*b* may also identify a portion of the resources of the control channel that are used for communicating data based on the common control message.

At step 520, base station 105-*b* may transmit a user-specific control message to UE 115-*b* (using one or more CCEs indicated by the common control message). That is, the control message may be transmitted on resources identified in step 515. In some examples, UE 115-*b* may perform a blind decoding operation to identify the user-specific control message.

At step 525, UE 115-*b* may perform rate matching on a data transmission based on whether resources indicated by the slow signaling are being used for sPDCCH or SPDSCH. UE 115-*b* may perform rate matching based on the common control message.

At step 530, UE 115-*b* and base station 105-*b* may communicate data based on the rate matching using the resources available for sPDSCH. In some cases, UE 115-*b* and base station 105-*b* may communicate data using a portion of the resources for the control channel. A grant received in the user-specific control message may indicate a low latency assignment, but may not indicate whether the assignment is punctured by one or more CCEs used for sPDCCH. Thus, the data may be communicated based on dynamic rate matching.

Figure 6:
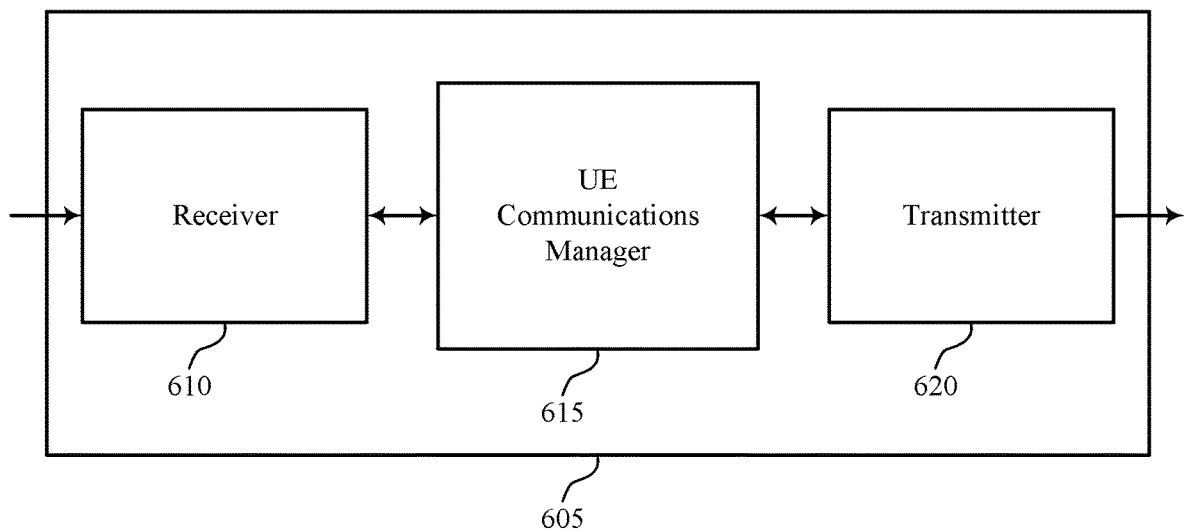

FIG. 6 shows a block diagram 600 of a wireless device 605 that supports sPDCCH and sPDSCH in accordance with various aspects of the present disclosure. Wireless device 605 may be an example of aspects of a UE 115 as described with reference to FIG. 1. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to sPDCCH and sPDSCH, etc.). Information may be passed on to other components of the device. The receiver 610 may be an example of aspects of the transceiver 935 described with reference to FIG. 9. Receiver 610 may also communicate data using a portion of the resources for a control channel based on a grant received in a user-specific control message. In some cases, receiver 610 may communicate data using a second portion of identified resources based on a common control message and a resource grant in the user-specific control message.

UE communications manager 615 may be an example of aspects of the UE communications manager 915 described with reference to FIG. 9. UE communications manager 615 may, in combination with receiver 610, receive signaling that identifies resources for a control channel associated with the second duration transmission time interval (TTI) and receive a user-specific control message of the control channel within the first duration TTI based on the signaling, where a location of the control channel within the first duration TTI is based on a location of a data region of the second duration TTI, where the first duration TTI and the second duration TTI at least partially overlap in time.

The UE communications manager 615 may also identify resources for a control channel associated with the second duration TTI, receive, in combination with receiver 610, a common control message of the control channel using the identified resources, where the common control message indicates a first portion of the resources for the control channel that are used for transmitting the control channel, and receive, in combination with receiver 610, a user-specific control message of the control channel using the first portion of the resources.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas. Transmitter 620 may also communicate data using a portion of the resources for a control channel based on a grant received in a user-specific control message. In some cases, Transmitter 620 may communicate data using a second portion of identified resources based on a common control message and a resource grant in the user-specific control message.

Figure 7:
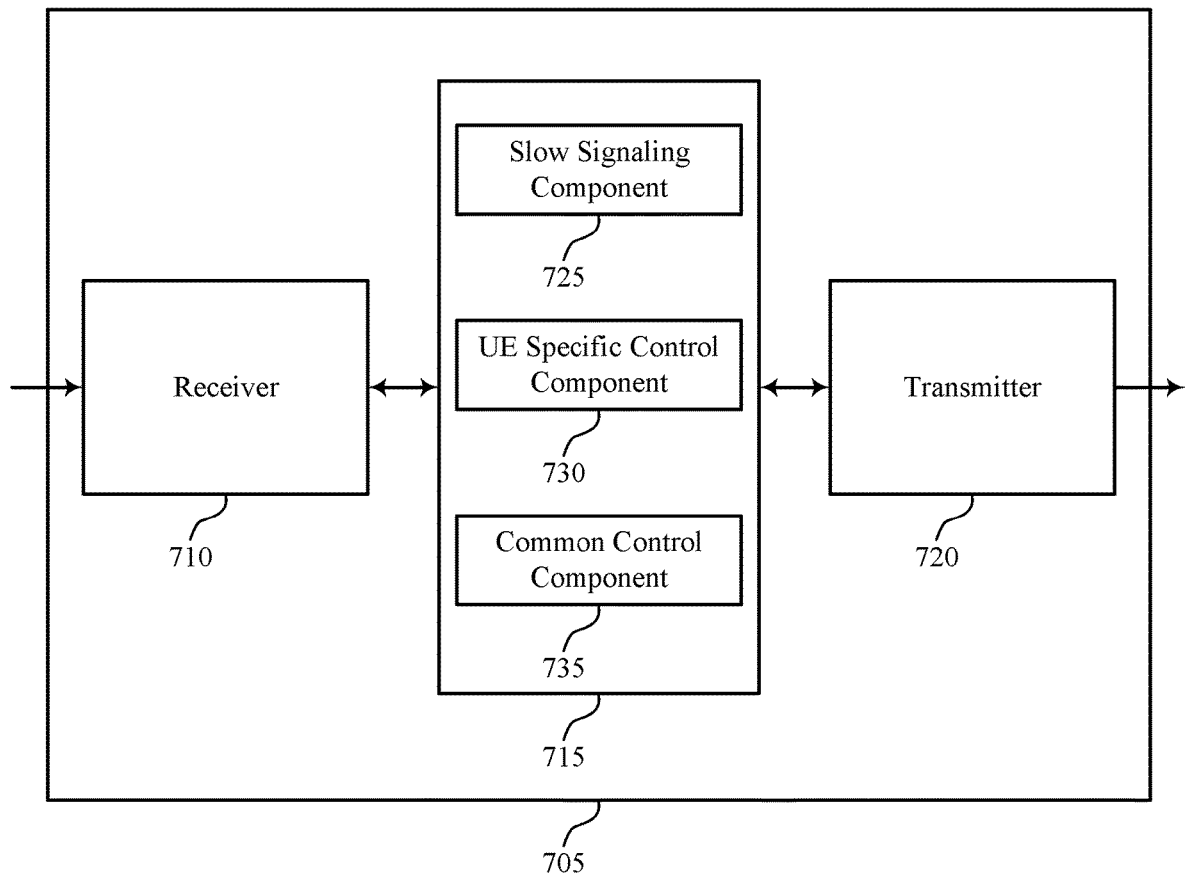

FIG. 7 shows a block diagram 700 of a wireless device 705 that supports sPDCCH and sPDSCH in accordance with various aspects of the present disclosure. Wireless device 705 may be an example of aspects of a wireless device 605 or a UE 115 as described with reference to FIGS. 1 and 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to sPDCCH and sPDSCH, etc.). Information may be passed on to other components of the device. The receiver 710 may be an example of aspects of the transceiver 935 described with reference to FIG. 9.

UE communications manager 715 may be an example of aspects of the UE communications manager 915 described with reference to FIG. 9. UE communications manager 715 may perform various functions in combination with receiver 710 or transmitter 720. UE communications manager 715 may also include slow signaling component 725, UE specific control component 730, and common control component 735.

Slow signaling component 725 may receive signaling that identifies resources for a control channel associated with the second duration TTI, identify resources for a control channel associated with the second duration TTI, and receive control signaling associated with the first duration TTI, where the resources are identified based on the control signaling. In some cases, the common control message is scrambled using a common RNTI.

In some cases, the resources for the control channel include a pattern of CCEs associated with two symbol TTIs, slot TTIs, or both. In some cases, the first duration TTI includes a subframe TTI, the second duration TTI includes a two symbol TTI, and where the resources for the control channel include resources located after a first symbol and a second symbol of a slot TTI based on a first symbol of the data region of the second duration TTI resources located after the first symbol and the second symbol of the slot duration TTI. In some cases, each CCE of the pattern corresponds to a first symbol of a two symbol TTI.

In some cases, the signaling includes an indication of one or more symbol periods used for the control channel, an indication of frequency domain resources used for the control channel, or an aggregation level of a common control message, or any combination thereof. In some cases, the CCEs associated with slot TTIs and CCEs associated with two symbol TTIs each include two symbol periods. In some cases, the CCEs associated with slot TTIs include two symbol periods and CCEs associated with two symbol TTIs include one symbol period. In some cases, one or more CCEs of the pattern include a set of symbol periods associated with a slot TTI duration.

UE specific control component 730 may receive a user-specific control message of the control channel within the first duration TTI based on the signaling, where a location of the control channel within the first duration TTI is based on a location of a data region of the second duration TTI, where the first duration TTI and the second duration TTI at least partially overlap in time and receive a user-specific control message of the control channel using the first portion of the resources.

Common control component 735 may receive a common control message of the control channel indicating a subset of the resources for the control channel used for transmitting the control channel and receive a common control message of the control channel using the identified resources, where the common control message indicates a first portion of the resources for the control channel that are used for transmitting the control channel. In some cases, the common control message includes a bitmap corresponding to the subset of resources for the control channel, where each bit of the bitmap indicates whether one or more CCEs of the identified resources for the control channel are used for transmitting the control channel.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
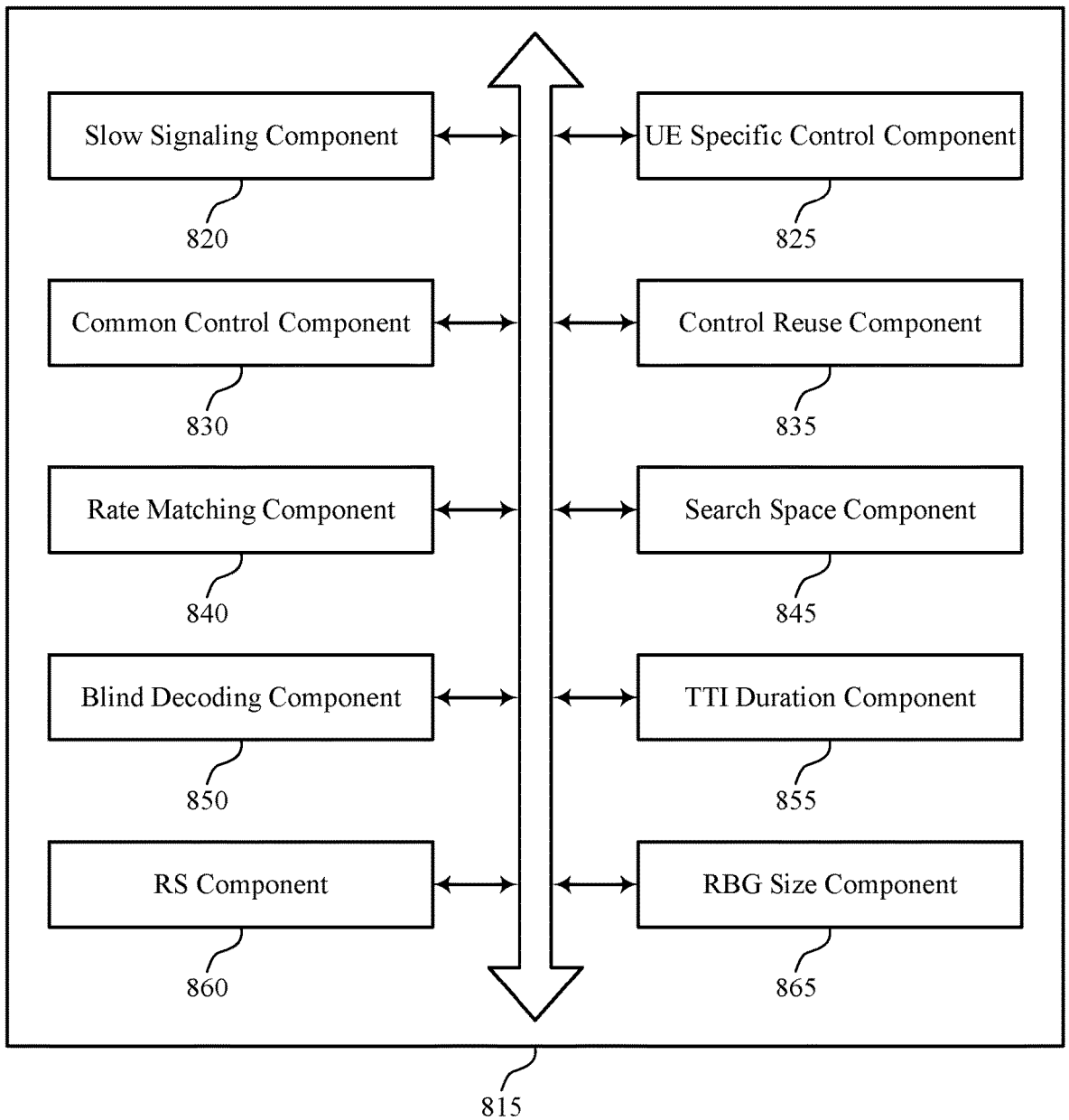
FIG. 8 illustrates a block diagram of a system including a user equipment (UE) that supports sPDCCH and sPDSCH in accordance with aspects of the present disclosure.

FIG. 8 shows a block diagram 800 of a UE communications manager 815 that supports sPDCCH and sPDSCH in accordance with various aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include slow signaling component 820, UE specific control component 825, common control component 830, control reuse component 835, rate matching component 840, search space component 845, blind decoding component 850, TTI duration component 855, RS component 860, and RBG size component 865. Each of these modules may communicate, directly or indirectly, with one another (e.g., via one or more buses).

Slow signaling component 820 may receive signaling that identifies resources for a control channel associated with the second duration TTI, identify resources for a control channel associated with the second duration TTI, and receive control signaling associated with the first duration TTI, where the resources are identified based on the control signaling.

UE specific control component 825 may receive a user-specific control message of the control channel within the first duration TTI based on the signaling, where a location of the control channel within the first duration TTI is based on a location of a data region of the second duration TTI, where the first duration TTI and the second duration TTI at least partially overlap in time and receive a user-specific control message of the control channel using the first portion of the resources.

Common control component 830 may receive a common control message of the control channel indicating a subset of the resources for the control channel used for transmitting the control channel and receive a common control message of the control channel using the identified resources, where the common control message indicates a first portion of the resources for the control channel that are used for transmitting the control channel.

In some cases, the control channel may be a UE-specific control channel, such as a UE-specific sPDCCH, or a common control channel, such as a CsPDCCH. The UE-specific control channel may transport a UE-specific control message that is addressed to, and intended for, a specific UE. In another example, the common control channel may transport a control message that is intended for one or more UEs, including up to all UEs connected to a base station. In another example, a common control channel may transport a UE-specific control message that is addressed to, and intended for, a specific UE. The specific UE, along with other UEs connected to the base station, may monitor the common control channel. For either the UE-specific control channel or the common control channel, a base station may assign a C-RNTI to the specific UE. The specific UE may use its C-RNTI to descramble a UE-specific control message intended for that UE during a blind decode of a search space corresponding to the UE-specific control channel or the common control channel.

Control reuse component 835 may identify the portion of the resources for the control channel that are used for communicating data based on the common control message. Rate matching component 840 may perform a rate matching operation for the data based on the common control message, where the data is communicated based on the rate matching operation.

Search space component 845 may identify a search space for the control channel based on the identified resources. Blind decoding component 850 may perform a blind decoding operation based on the search space, where the user-specific control message is received based on the blind decoding operation.

TTI duration component 855 may determine whether a TTI is a two symbol TTI or a slot TTI based on the signaling or the user-specific control message. RS component 860 may receive one or more CRSs or demodulation reference signals (DMRS) based on the resources for the control channel. RBG size component 865 may identify a RBG size, where the data is communicated based on the RBG size.

Figure 9:
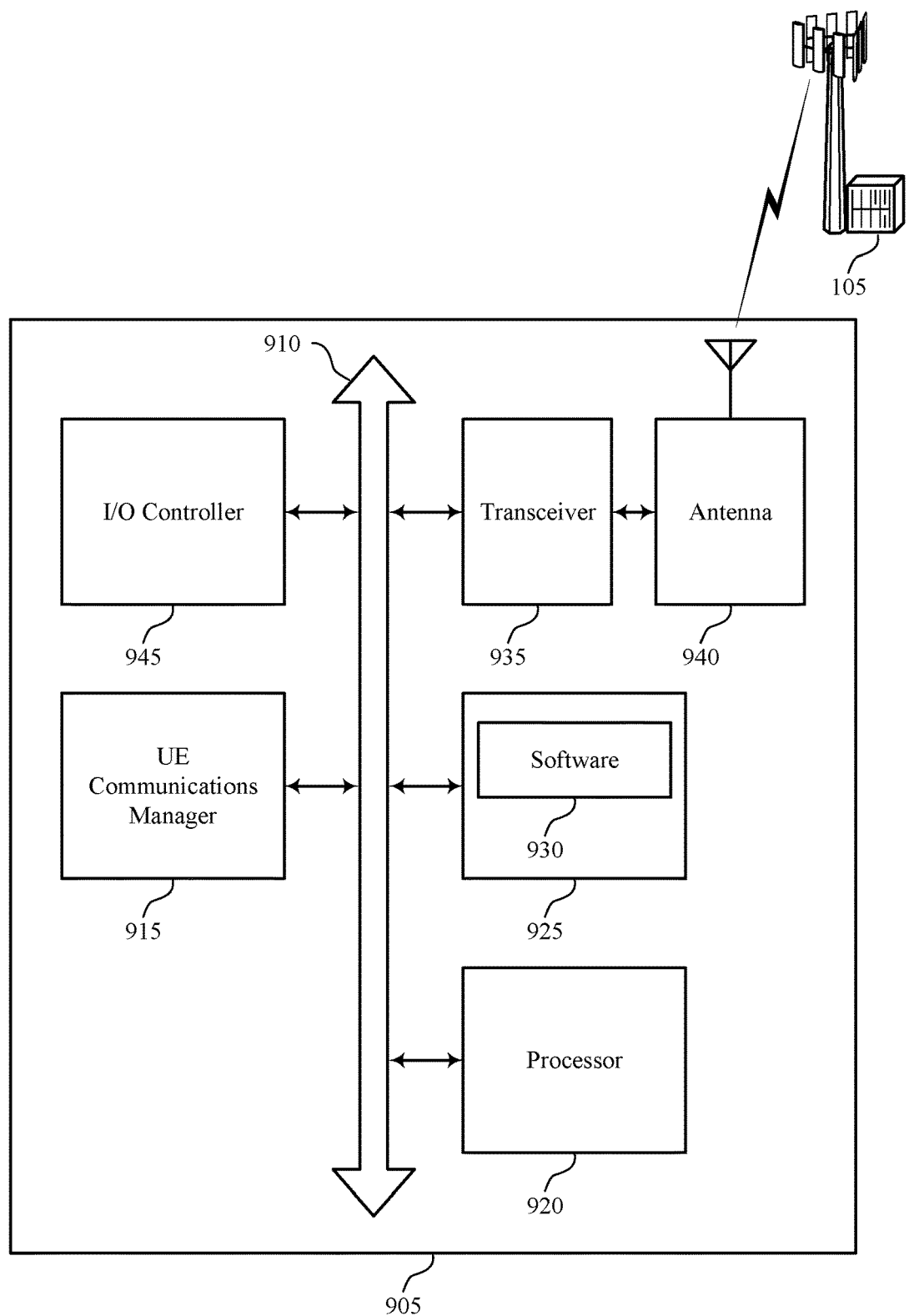
FIGS. 9 through 11 show block diagrams of a device or devices that support sPDCCH and sPDSCH in accordance with aspects of the present disclosure.

FIG. 9 shows a diagram of a system 900 including a device 905 that supports sPDCCH and sPDSCH in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting sPDCCH and sPDSCH).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support sPDCCH and sPDSCH. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
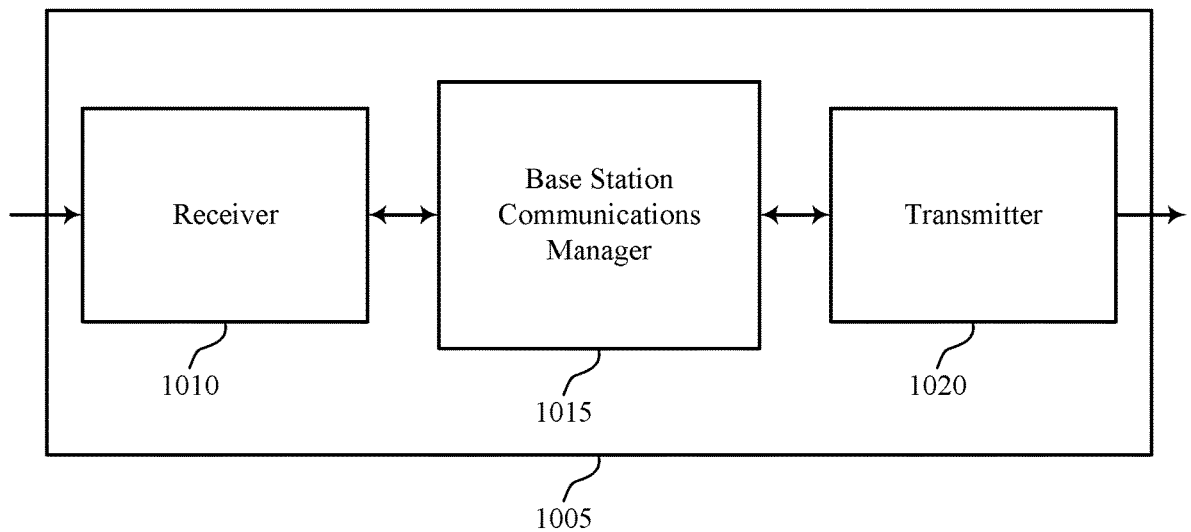

FIG. 10 shows a block diagram 1000 of a wireless device 1005 that supports sPDCCH and sPDSCH in accordance with various aspects of the present disclosure. Wireless device 1005 may be an example of aspects of a base station 105 as described with reference to FIG. 1. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to sPDCCH and sPDSCH, etc.). Information may be passed on to other components of the device. The receiver 1010 may be an example of aspects of the transceiver 1335 described with reference to FIG. 13. The receiver 1010 may communicate data using a portion of the resources for the control channel identified in the user-specific control message.

Base station communications manager 1015 may be an example of aspects of the base station communications manager 1315 described with reference to FIG. 13. Base station communications manager 1015 may, in combination with transmitter 1020, transmit signaling that identifies resources for a control channel associated with the second duration TTI and transmit a user-specific control message of the control channel within the first duration TTI based on the signaling, where a location of the control channel within the first duration TTI is based on a location of a data region of the second duration TTI, where the first duration TTI and the second duration TTI at least partially overlap in time.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas. Transmitter 1020 may communicate data using a portion of the resources for the control channel identified in the user-specific control message.

Figure 11:
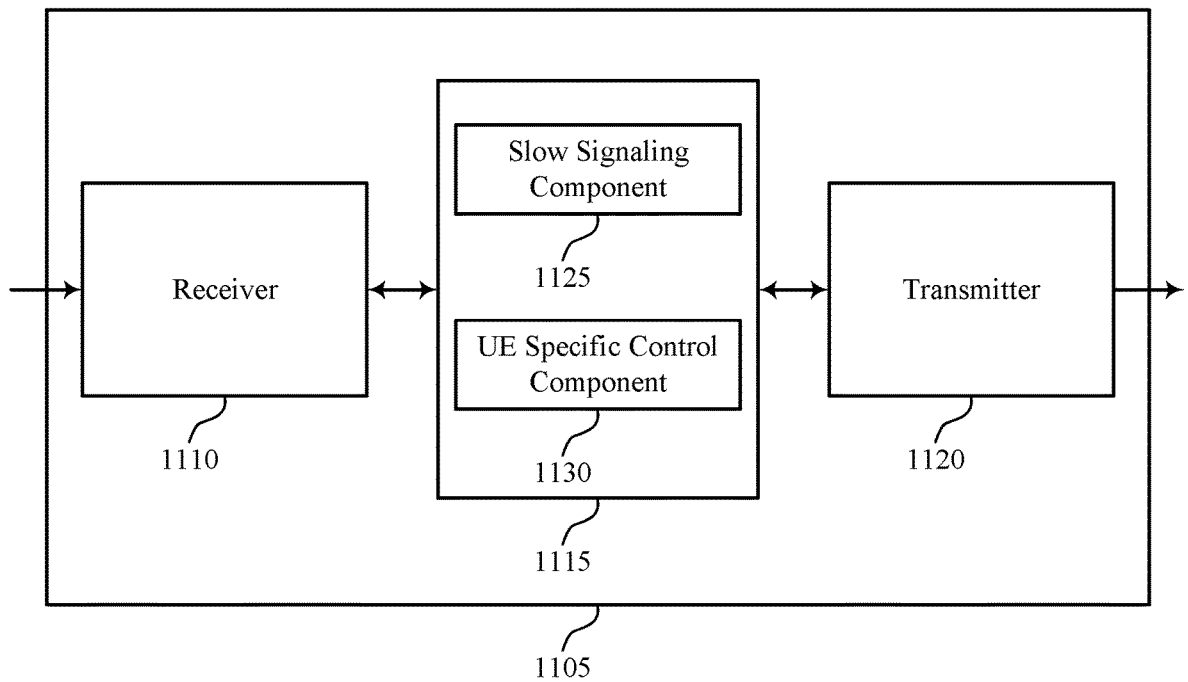

FIG. 11 shows a block diagram 1100 of a wireless device 1105 that supports sPDCCH and sPDSCH in accordance with various aspects of the present disclosure. Wireless device 1105 may be an example of aspects of a wireless device 1005 or a base station 105 as described with reference to FIGS. 1 and 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to sPDCCH and sPDSCH, etc.). Information may be passed on to other components of the device. The receiver 1110 may be an example of aspects of the transceiver 1335 described with reference to FIG. 13.

Base station communications manager 1115 may be an example of aspects of the base station communications manager 1315 described with reference to FIG. 13. Base station communications manager 1115 may perform various functions in combination with receiver 1110 or transmitter 1120. Base station communications manager 1115 may also include slow signaling component 1125 and UE specific control component 1130.

Slow signaling component 1125 may transmit signaling that identifies resources for a control channel associated with the second duration TTI. In some cases, the resources for the control channel include a pattern of CCEs associated with two symbol TTIs, slot TTIs, or both.

UE specific control component 1130 may transmit a user-specific control message of the control channel within the first duration TTI based on the signaling, where a location of the control channel within the first duration TTI is based on a location of a data region of the second duration TTI, where the first duration TTI and the second duration TTI at least partially overlap in time.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
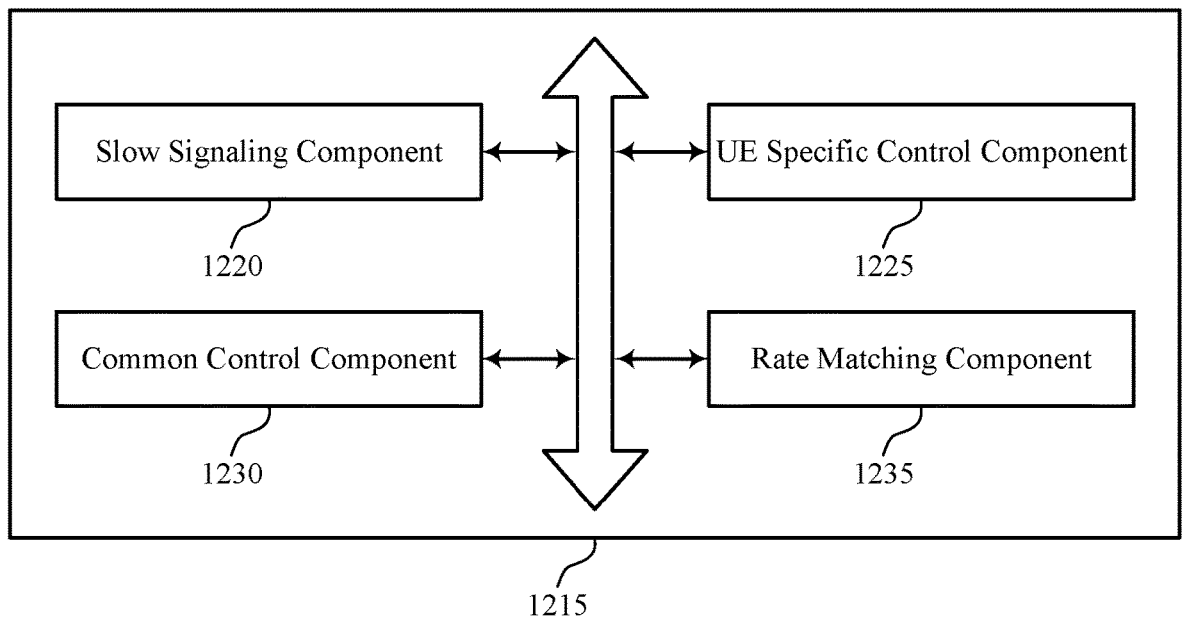
FIG. 12 illustrates a block diagram of a system including a base station that supports sPDCCH and sPDSCH in accordance with aspects of the present disclosure.

FIG. 12 shows a block diagram 1200 of a base station communications manager 1215 that supports sPDCCH and sPDSCH in accordance with various aspects of the present disclosure. The base station communications manager 1215 may be an example of aspects of a base station communications manager 1315 described with reference to FIGS. 10, 11, and 13. The base station communications manager 1215 may include slow signaling component 1220, UE specific control component 1225, common control component 1230, and rate matching component 1235. Each of these modules may communicate, directly or indirectly, with one another (e.g., via one or more buses).

Slow signaling component 1220 may transmit signaling that identifies resources for a control channel associated with the second duration TTI. In some cases, the resources for the control channel include a pattern of CCEs associated with two symbol TTIs, slot TTIs, or both.

UE specific control component 1225 may transmit a user-specific control message of the control channel within the first duration TTI based on the signaling, where a location of the control channel within the first duration TTI is based on a location of a data region of the second duration TTI, where the first duration TTI and the second duration TTI at least partially overlap in time.

Common control component 1230 may identify a portion of the resources for the control channel that are used for transmitting the control channel and transmit a common control message of the control channel indicating the portion of the resources that are used for transmitting the control channel. In some cases, the common control message includes a bitmap corresponding to the subset of resources for the control channel, where each bit of the bitmap indicates whether one or more CCEs of the identified resources for the control channel are used for transmitting the control channel.

Rate matching component 1235 may perform a rate matching operation for the data based on the portion of the resources for the control channel that are used for transmitting the control channel.

Figure 13:
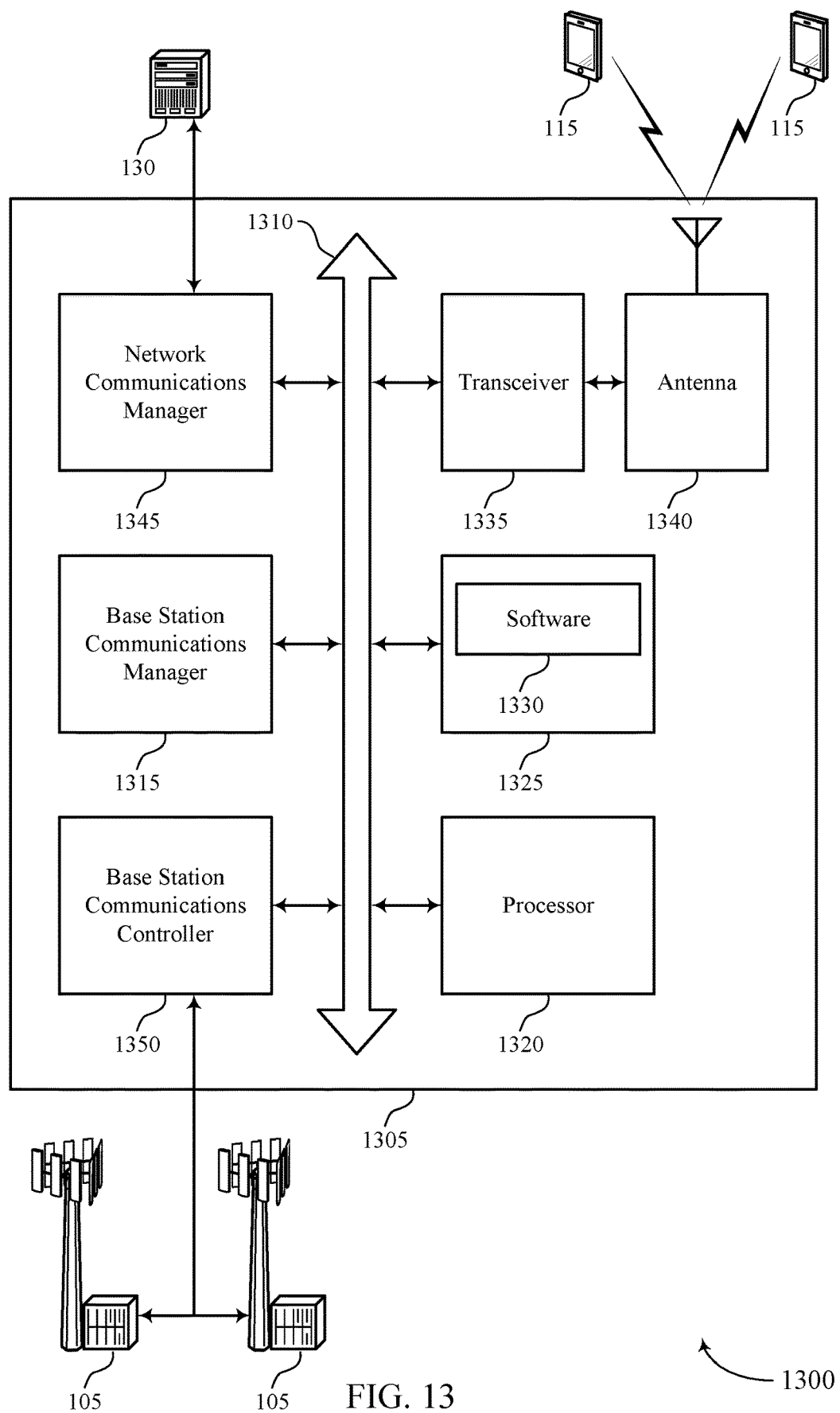
FIGS. 13 through 18 illustrate methods that supports sPDCCH and sPDSCH in accordance with aspects of the present disclosure.

FIG. 13 shows a diagram of a system 1300 including a device 1305 that supports sPDCCH and sPDSCH in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and base station communications controller 1350. These components may be in electronic communication via one or more busses (e.g., bus 1310). Device 1305 may communicate wirelessly with one or more UEs 115.

Base station communications manager 1315 may manage communications with other base station 105, and may include a controller or scheduler for controlling communications with UEs 115 in cooperation with other base stations 105. For example, the base station communications manager 1315 may coordinate scheduling for transmissions to UEs 115 for various interference mitigation techniques such as beamforming or joint transmission. In some examples, base station communications manager 1315 may provide an X2 interface within an Long Term Evolution (LTE)/LTE-A wireless communication network technology to provide communication between base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting sPDCCH and sPDSCH).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support sPDCCH and sPDSCH. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications controller 1350 may manage communications with other base station 105, and may include a controller or scheduler for controlling communications with UEs 115 in cooperation with other base stations 105. For example, the base station communications controller 1350 may coordinate scheduling for transmissions to UEs 115 for various interference mitigation techniques such as beamforming or joint transmission. In some examples, base station communications controller 1350 may provide an X2 interface within an LTE/LTE-A wireless communication network technology to provide communication between base stations 105.

Figure 14:
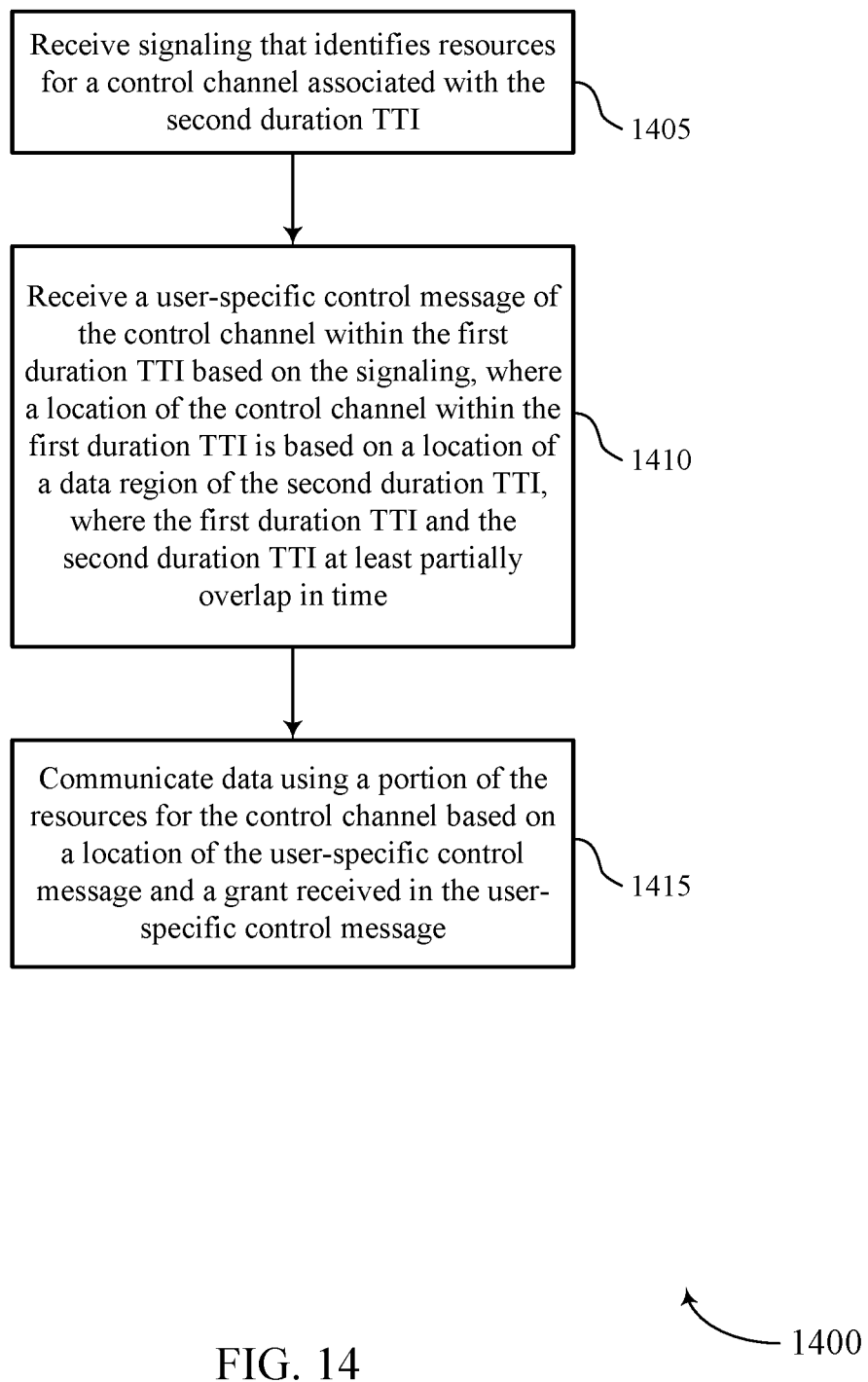

FIG. 14 shows a flowchart illustrating a method 1400 that supports sPDCCH and sPDSCH in accordance with various aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive signaling that identifies resources for a control channel associated with the second duration TTI. The operations of block 1405 may be performed according to the methods described with reference to FIGS. 1 through 4. In certain examples, aspects of the operations of block 1405 may be performed by a slow signaling component as described with reference to FIGS. 6 through 9.

At block 1410 the UE 115 may receive a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time. The operations of block 1410 may be performed according to the methods described with reference to FIGS. 1 through 4. In certain examples, aspects of the operations of block 1410 may be performed by a UE specific control component as described with reference to FIGS. 6 through 9.

At block 1415 the UE 115 may communicate data using a portion of the resources for the control channel based at least in part on a location of the user-specific control message and a grant received in the user-specific control message. The operations of block 1415 may be performed according to the methods described with reference to FIGS. 1 through 4. In certain examples, aspects of the operations of block 1415 may be performed by a receiver as described with reference to FIGS. 6 through 9.

Figure 15:
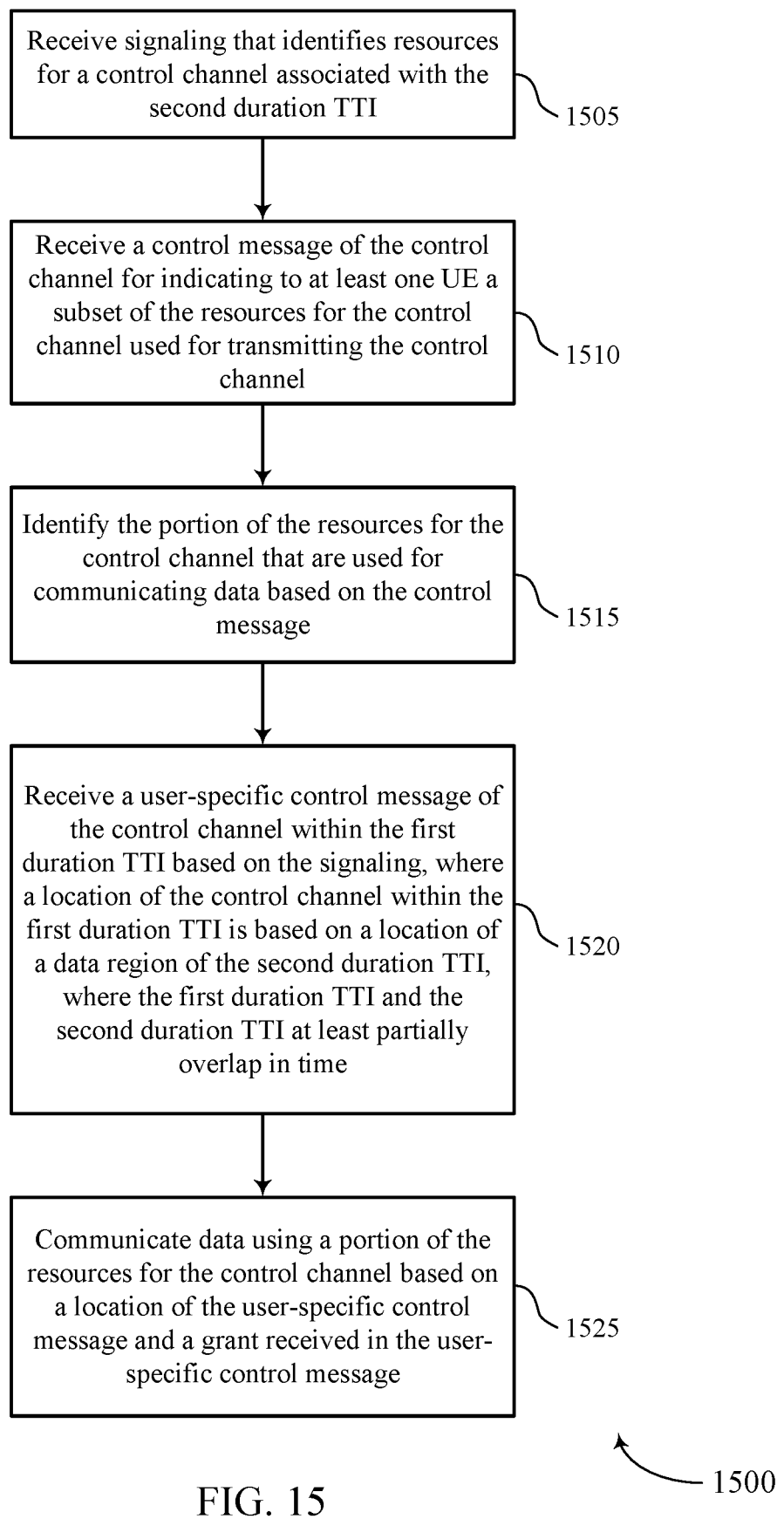

FIG. 15 shows a flowchart illustrating a method 1500 that supports sPDCCH and sPDSCH in accordance with various aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive signaling that identifies resources for a control channel associated with the second duration TTI. The operations of block 1505 may be performed according to the methods described with reference to FIGS. 1 through 4. In certain examples, aspects of the operations of block 1505 may be performed by a slow signaling component as described with reference to FIGS. 6 through 9.

At block 1510 the UE 115 may receive a control message of the control channel for indicating to at least one UE a subset of the resources for the control channel used for transmitting the control channel. In some cases, the control channel may be a UE-specific control channel, such as a UE-specific sPDCCH, or a common control channel, such as a CsPDCCH. The UE-specific control channel may transport a UE-specific control message that is addressed to, and intended for, a specific UE. In another example, the common control channel may transport a control message that is intended for one or more UEs, including up to all UEs connected to a base station. In another example, a common control channel may transport a UE-specific control message that is addressed to, and intended for, a specific UE. The specific UE, along with other UEs connected to the base station, may monitor the common control channel. For either the UE-specific control channel or the common control channel, a base station may assign a C-RNTI to the specific UE. The specific UE may use its C-RNTI to descramble a UE-specific control message intended for that UE during a blind decode of a search space corresponding to the UE-specific control channel or the common control channel. Because other UEs are assigned a different C-RNTI, those other UEs may not be able to descramble a UE-specific control message intended for a different UE. In some cases, common control messages intended for more than one UE may be descrambled by intended UEs using a common RNTI. The operations of block 1510 may be performed according to the methods described with reference to FIGS. 1 through 4. In certain examples, aspects of the operations of block 1510 may be performed by a common control component as described with reference to FIGS. 6 through 9.

At block 1515 the UE 115 may identify the portion of the resources for the control channel that are used for communicating data based at least in part on the control message. The operations of block 1515 may be performed according to the methods described with reference to FIGS. 1 through 4. In certain examples, aspects of the operations of block 1515 may be performed by a control reuse component as described with reference to FIGS. 6 through 9.

At block 1520 the UE 115 may receive a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time. The operations of block 1520 may be performed according to the methods described with reference to FIGS. 1 through 4. In certain examples, aspects of the operations of block 1520 may be performed by a UE specific control component as described with reference to FIGS. 6 through 9.

At block 1525 the UE 115 may communicate data using a portion of the resources for the control channel based at least in part on a location of the user-specific control message and a grant received in the user-specific control message. The operations of block 1525 may be performed according to the methods described with reference to FIGS. 1 through 4. In certain examples, aspects of the operations of block 1525 may be performed by a receiver as described with reference to FIGS. 6 through 9.

Figure 16:
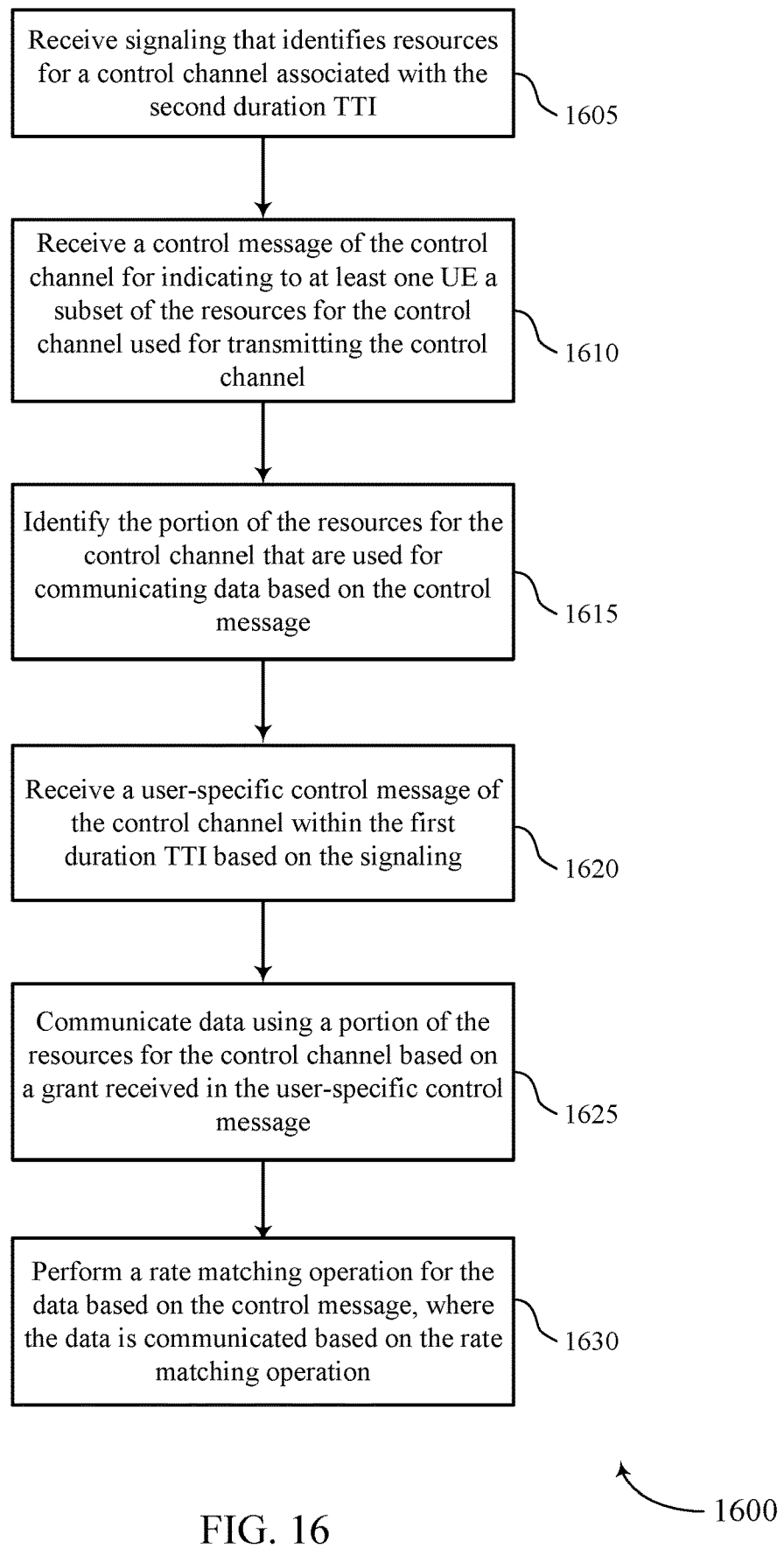

FIG. 16 shows a flowchart illustrating a method 1600 that supports sPDCCH and sPDSCH in accordance with various aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive signaling that identifies resources for a control channel associated with the second duration TTI. The operations of block 1605 may be performed according to the methods described with reference to FIGS. 1 through 4. In certain examples, aspects of the operations of block 1605 may be performed by a slow signaling component as described with reference to FIGS. 6 through 9.

At block 1610 the UE 115 may receive a control message of the control channel for indicating to at least one UE a subset of the resources for the control channel used for transmitting the control channel. In some cases, the control channel may be a UE-specific control channel, such as a UE-specific sPDCCH, or a common control channel, such as a CsPDCCH. The UE-specific control channel may transport a UE-specific control message that is addressed to, and intended for, a specific UE. In another example, the common control channel may transport a control message that is intended for one or more UEs, including up to all UEs connected to a base station. In another example, a common control channel may transport a UE-specific control message that is addressed to, and intended for, a specific UE. The specific UE, along with other UEs connected to the base station, may monitor the common control channel. For either the UE-specific control channel or the common control channel, a base station may assign a C-RNTI to the specific UE. The specific UE may use its C-RNTI to descramble a UE-specific control message intended for that UE during a blind decode of a search space corresponding to the UE-specific control channel or the common control channel. Because other UEs are assigned a different C-RNTI, those other UEs may not be able to descramble a UE-specific control message intended for a different UE. In some cases, common control messages intended for more than one UE may be descrambled by intended UEs using a common RNTI. The operations of block 1610 may be performed according to the methods described with reference to FIGS. 1 through 4. In certain examples, aspects of the operations of block 1610 may be performed by a common control component as described with reference to FIGS. 6 through 9.

At block 1615 the UE 115 may identify the portion of the resources for the control channel that are used for communicating data based at least in part on the control message. The operations of block 1615 may be performed according to the methods described with reference to FIGS. 1 through 4. In certain examples, aspects of the operations of block 1615 may be performed by a control reuse component as described with reference to FIGS. 6 through 9.

At block 1620 the UE 115 may receive a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time. The operations of block 1620 may be performed according to the methods described with reference to FIGS. 1 through 4. In certain examples, aspects of the operations of block 1620 may be performed by a UE specific control component as described with reference to FIGS. 6 through 9.

At block 1625 the UE 115 may communicate data using a portion of the resources for the control channel based at least in part on a location of the user-specific control message and a grant received in the user-specific control message. The operations of block 1625 may be performed according to the methods described with reference to FIGS. 1 through 4. In certain examples, aspects of the operations of block 1625 may be performed by a receiver as described with reference to FIGS. 6 through 9.

At block 1630 the UE 115 may perform a rate matching operation for the data based at least in part on the control message, wherein the data is communicated based at least in part on the rate matching operation. The operations of block 1630 may be performed according to the methods described with reference to FIGS. 1 through 4. In certain examples, aspects of the operations of block 1630 may be performed by a rate matching component as described with reference to FIGS. 6 through 9.

Figure 17:
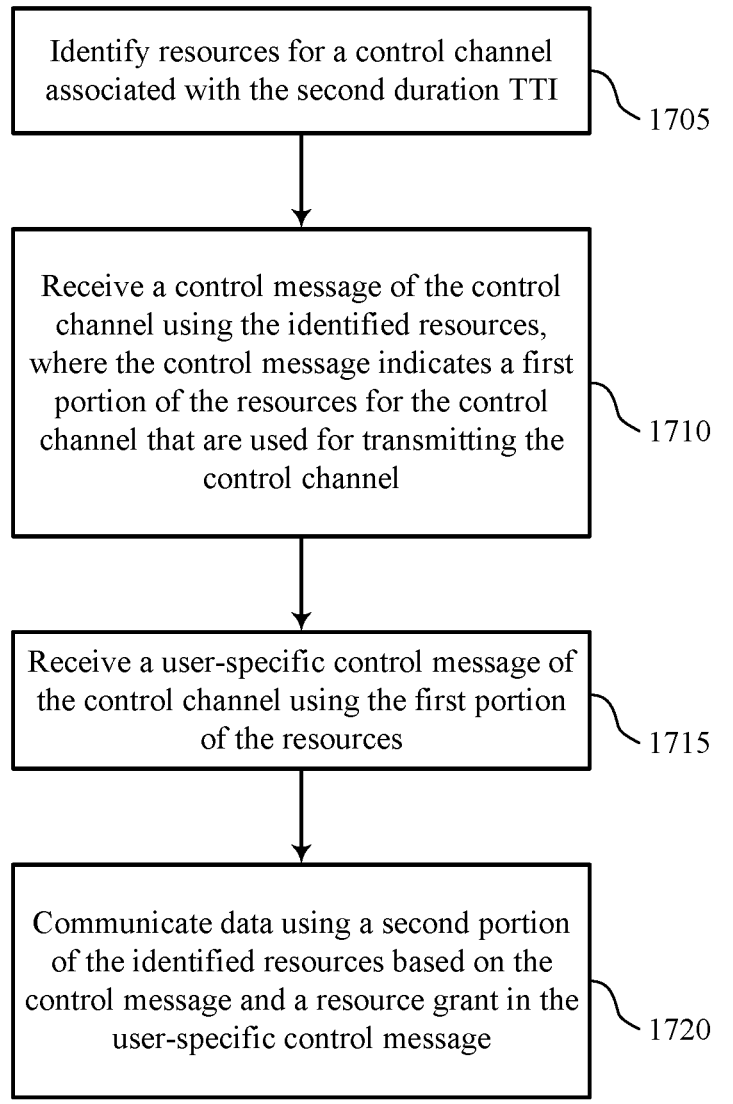

FIG. 17 shows a flowchart illustrating a method 1700 that supports sPDCCH and sPDSCH in accordance with various aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify resources for a control channel associated with the second duration TTI. The operations of block 1705 may be performed according to the methods described with reference to FIGS. 1 through 4. In certain examples, aspects of the operations of block 1705 may be performed by a slow signaling component as described with reference to FIGS. 6 through 9.

At block 1710 the UE 115 may receive a control message of the control channel using the identified resources, wherein the control message indicates a first portion of the resources for the control channel that are used for transmitting the control channel. The operations of block 1710 may be performed according to the methods described with reference to FIGS. 1 through 4. In certain examples, aspects of the operations of block 1710 may be performed by a common control component as described with reference to FIGS. 6 through 9.

At block 1715 the UE 115 may receive a user-specific control message of the control channel using the first portion of the resources. The operations of block 1715 may be performed according to the methods described with reference to FIGS. 1 through 4. In certain examples, aspects of the operations of block 1715 may be performed by a UE specific control component as described with reference to FIGS. 6 through 9.

At block 1720 the UE 115 may communicate data using a second portion of the identified resources based at least in part on the control message and a resource grant in the user-specific control message. The operations of block 1720 may be performed according to the methods described with reference to FIGS. 1 through 4. In certain examples, aspects of the operations of block 1720 may be performed by a receiver as described with reference to FIGS. 6 through 9.

Figure 18:
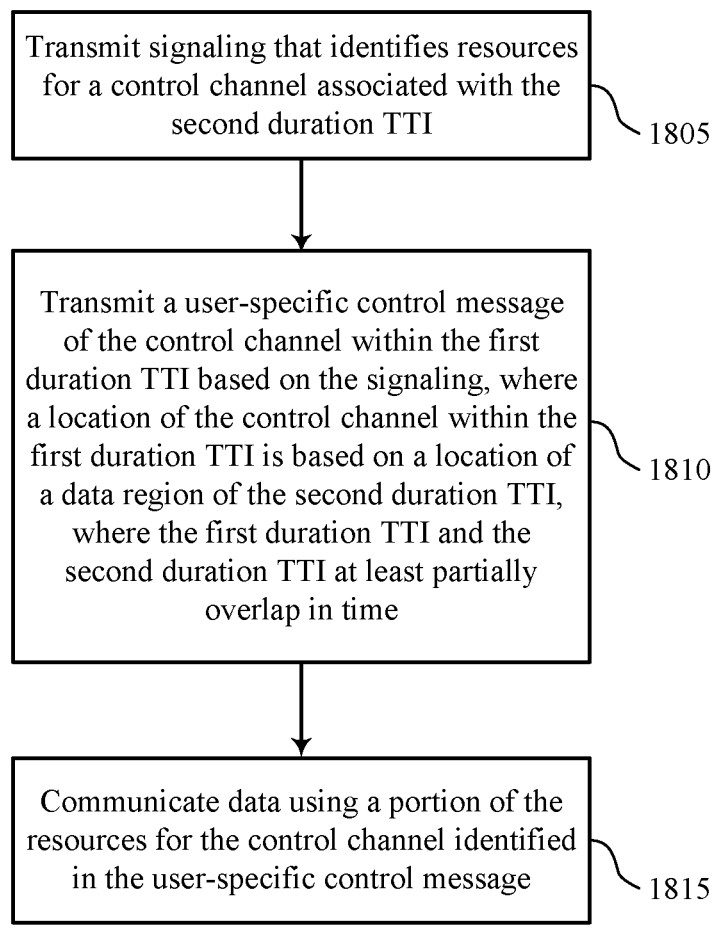

FIG. 18 shows a flowchart illustrating a method 1800 that supports sPDCCH and sPDSCH in accordance with various aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below.

Additionally or alternatively, the base station 105 may perform aspects of the functions described below using special-purpose hardware.

At block 1805 the base station 105 may transmit signaling that identifies resources for a control channel associated with the second duration TTI. The operations of block 1805 may be performed according to the methods described with reference to FIGS. 1 through 4. In certain examples, aspects of the operations of block 1805 may be performed by a slow signaling component as described with reference to FIGS. 10 through 13.

At block 1810 the base station 105 may transmit a user-specific control message of the control channel within the first duration TTI based at least in part on the signaling, wherein a location of the control channel within the first duration TTI is based at least in part on a location of a data region of the second duration TTI, wherein the first duration TTI and the second duration TTI at least partially overlap in time. The operations of block 1810 may be performed according to the methods described with reference to FIGS. 1 through 4. In certain examples, aspects of the operations of block 1810 may be performed by a UE specific control component as described with reference to FIGS. 10 through 13.

At block 1815 the base station 105 may communicate data using a portion of the resources for the control channel identified in the user-specific control message. The operations of block 1815 may be performed according to the methods described with reference to FIGS. 1 through 4. In certain examples, aspects of the operations of block 1815 may be performed by a transmitter as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a system that supports communication using a first duration transmission time interval (TTI) and a second duration TTI that is shorter than the first duration TTI, comprising:
   receiving, within the first duration TTI, signaling that identifies resources for a control channel associated with the second duration TTI, wherein the signaling includes a user-specific control message of the control channel for the second duration TTI, wherein a location of the control channel within the first duration TTI is based at least in part on a configuration of a data region of the second duration TTI, and wherein the first duration TTI and the second duration TTI at least partially overlap in time; and
   communicating data using a portion of the resources for the control channel based at least in part on a location of the user-specific control message and a grant received in the user-specific control message.

2. The method of claim 1, further comprising:
   receiving a control message of the control channel for indicating to at least one user equipment (UE) a subset of the resources for the control channel used for transmitting the control channel; and
   identifying the portion of the resources for the control channel that are used for communicating data based at least in part on the control message.

3. The method of claim 2, wherein the control message comprises a bitmap corresponding to the subset of the resources for the control channel, wherein each bit of the bitmap indicates whether one or more control channel elements (CCEs) of the identified resources for the control channel are used for transmitting the control channel.

4. The method of claim 2, further comprising:
   performing a rate matching operation for the data based at least in part on the control message, wherein the data is communicated based at least in part on the rate matching operation.

5. The method of claim 1, further comprising:
   identifying a search space for the control channel based at least in part on the identified resources; and
   performing a blind decoding operation based at least in part on the search space, wherein the user-specific control message is received based at least in part on the blind decoding operation.

6. The method of claim 1, wherein the signaling comprises an indication of one or more symbol periods used for the control channel, an indication of frequency domain resources used for the control channel, or an aggregation level of a control message, or any combination thereof.

7. The method of claim 1, wherein the resources for the control channel comprise a pattern of control channel elements (CCEs) associated with two symbol duration TTIs, slot duration TTIs, or both.

8. The method of claim 7, wherein the first duration TTI comprises a subframe duration TTI, the second duration TTI comprises a two symbol duration TTI, and wherein the resources for the control channel include resources located after a first symbol and a second symbol of a slot duration TTI.

9. The method of claim 7, wherein each CCE of the pattern corresponds to a first symbol of a two symbol duration TTI.

10. The method of claim 7, wherein one or more CCEs of the pattern include a plurality of symbol periods associated with a slot duration TTI duration.

11. The method of claim 7, wherein the CCEs associated with slot duration TTIs and the CCEs associated with two symbol duration TTIs each comprise two symbol periods.

12. The method of claim 7, wherein the CCEs associated with slot duration TTIs comprise two symbol periods and the CCEs associated with two symbol duration TTIs comprise one symbol period.

13. The method of claim 1, further comprising:
   determining whether a TTI is a two symbol duration TTI or a slot duration TTI based at least in part on the signaling or the user-specific control message.

14. The method of claim 1, further comprising:
   receiving one or more cell-specific reference signals (CRS) or demodulation reference signals (DMRS) based at least in part on the resources for the control channel.

15. The method of claim 1, further comprising:
   identifying a resource block group (RBG) size, wherein the data is communicated based at least in part on the RBG size.

16. The method of claim 1, wherein the configuration of the data region of the second duration TTI indicates a location of the data region of the second duration TTI.

17. A method for wireless communication in a system that supports communication using a first duration transmission time interval (TTI) and a second duration TTI that is shorter than the first duration TTI, comprising:
   transmitting, within the first duration TTI, signaling that identifies resources for a control channel associated with the second duration TTI, wherein the signaling includes a user-specific control message of the control channel for the second duration TTI, wherein a location of the control channel within the first duration TTI is based at least in part on a configuration of a data region of the second duration TTI, and wherein the first duration TTI and the second duration TTI at least partially overlap in time; and
   communicating data using a portion of the resources for the control channel identified in the user-specific control message.

18. The method of claim 17, further comprising:
   identifying the portion of the resources for the control channel that are used for transmitting the control channel; and
   transmitting a control message of the control channel for indicating to at least one user equipment (UE) a subset of the resources used for transmitting the control channel.

19. The method of claim 18, wherein the control message comprises a bitmap corresponding to the subset of the resources for the control channel, wherein each bit of the bitmap indicates whether one or more control channel elements (CCEs) of the identified resources for the control channel are used for transmitting the control channel.

20. The method of claim 17, further comprising:
   performing a rate matching operation for the data based at least in part on the portion of the resources for the control channel that are used for transmitting the control channel.

21. The method of claim 17, wherein the resources for the control channel comprise a pattern of control channel elements (CCEs) associated with two symbol duration TTIs, slot duration TTIs, or both.

22. The method of claim 17, wherein the configuration of the data region of the second duration TTI indicates a location of the data region of the second duration TTI.

23. An apparatus for wireless communication in a system that supports communication using a first duration transmission time interval (TTI) and a second duration TTI that is shorter than the first duration TTI, comprising:
a processor;
memory in electronic communication with the processor; and
instructions stored in the memory, wherein the instructions are executable by the processor to:
receive, within the first duration TTI, signaling that identifies resources for a control channel associated with the second duration TTI, wherein the signaling includes a user-specific control message of the control channel for the second duration TTI, wherein a location of the control channel within the first duration TTI is based at least in part on a configuration of a data region of the second duration TTI, and wherein the first duration TTI and the second duration TTI at least partially overlap in time; and
communicate data using a portion of the resources for the control channel based at least in part on a location of the user-specific control message and a grant received in the user-specific control message.

24. The apparatus of claim 23, further comprising instructions executable by the processor to:
receive a control message of the control channel for indicating to at least one user equipment (UE) a subset of the resources for the control channel used for transmitting the control channel; and
identify the portion of the resources for the control channel that are used for communicating data based at least in part on the control message.

25. The apparatus of claim 24, wherein the control message comprises a bitmap corresponding to the subset of the resources for the control channel, wherein each bit of the bitmap indicates whether one or more control channel elements (CCEs) of the identified resources for the control channel are used for transmitting the control channel.

26. The apparatus of claim 24, further comprising instructions executable by the processor to:
perform a rate matching operation for the data based at least in part on the control message, wherein the data is communicated based at least in part on the rate matching operation.

27. An apparatus for wireless communication in a system that supports communication using a first duration transmission time interval (TTI) and a second duration TTI that is shorter than the first duration TTI, comprising:
a processor;
memory in electronic communication with the processor; and
instructions stored in the memory, wherein the instructions are executable by the processor to:
transmit, within the first duration TTI, signaling that identifies resources for a control channel associated with the second duration TTI, wherein the signaling includes a user-specific control message of the control channel for the second duration TTI, wherein a location of the control channel within the first duration TTI is based at least in part on a configuration of a data region of the second duration TTI, and wherein the first duration TTI and the second duration TTI at least partially overlap in time; and
communicate data using a portion of the resources for the control channel identified in the user-specific control message.

28. The apparatus of claim 27, further comprising instructions executable by the processor to:
identify the portion of the resources for the control channel that are used for transmitting the control channel; and
transmit a control message of the control channel for indicating to at least one user equipment (UE) a subset of the resources used for transmitting the control channel.

29. The apparatus of claim 28, wherein the control message comprises a bitmap corresponding to the subset of the resources for the control channel, wherein each bit of the bitmap indicates whether one or more control channel elements (CCEs) of the identified resources for the control channel are used for transmitting the control channel.

30. The apparatus of claim 27, further comprising instructions executable by the processor to:
perform a rate matching operation for the data based at least in part on the portion of the resources for the control channel that are used for transmitting the control channel.

* * * * *